United States Patent
Hirotani et al.

(10) Patent No.: US 11,603,051 B2
(45) Date of Patent: *Mar. 14, 2023

(54) DECORATIVE COMPONENT FOR VEHICLE

(71) Applicant: TOYODA GOSEI CO., LTD., Kiyosu (JP)

(72) Inventors: Kozo Hirotani, Kiyosu (JP); Hiroyuki Yamada, Kiyosu (JP); Tohoru Matsunami, Kiyosu (JP); Hiroaki Ando, Kiyosu (JP); Kimihiro Iimura, Kiyosu (JP); Hideto Maeda, Kiyosu (JP); Tetsuo Yasuda, Kiyosu (JP); Akihiro Misawa, Kiyosu (JP); Chiharu Totani, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/838,761

(22) Filed: Jun. 13, 2022

(65) Prior Publication Data
US 2022/0314899 A1 Oct. 6, 2022

Related U.S. Application Data

(63) Continuation of application No. 16/640,838, filed as application No. PCT/JP2018/033313 on Sep. 7, 2018, now Pat. No. 11,370,366.

(30) Foreign Application Priority Data

Sep. 28, 2017 (JP) .............................. JP2017-188728
Sep. 29, 2017 (JP) .............................. JP2017-189704
(Continued)

(51) Int. Cl.
*G09F 21/04* (2006.01)
*B60R 13/00* (2006.01)
(Continued)

(52) U.S. Cl.
CPC .......... *B60R 13/005* (2013.01); *G09F 21/048* (2013.01); *H05B 3/02* (2013.01); *H05B 3/20* (2013.01)

(58) Field of Classification Search
CPC ........................... B60R 13/005; G09F 21/048
See application file for complete search history.

(56) References Cited

U.S. PATENT DOCUMENTS 6,674,392 B1 1/2004 Schmidt et al.
2005/0115943 A1 6/2005 Winter et al.
(Continued)

FOREIGN PATENT DOCUMENTS

JP H10-132921 A 5/1998
JP 2003-518633 A 6/2003
(Continued)

OTHER PUBLICATIONS

International Search Report of the International Searching Authority dated Dec. 4, 2018 for the corresponding International application No. PCT/JP2018/033313 (and English translation).

*Primary Examiner* — Gary C Hoge
(74) *Attorney, Agent, or Firm* — Posz Law Group, PLC

(57) ABSTRACT

A garnish includes a heating element, a base member, and a circuit board. The heating element is configured by stacking first and second sheet materials and interposing a heater wire in between. The circuit board includes a power source line and is fixed to a back surface of the base member. The heating element includes a main body portion and an extending portion. The extending portion includes a power source connection portion for connecting the heater wire to the power source line and extends to the back surface of the base member. The main body portion of the heating element is fixed to a laying surface of the base member by fixing the second sheet material to the base member. The heater wire (Continued)

is exposed in the power source connection portion without stacking the second sheet material on the first sheet material.

4 Claims, 19 Drawing Sheets

(30) Foreign Application Priority Data

| Mar. 22, 2018 | (JP) | JP2018-054501 |
| Mar. 22, 2018 | (JP) | JP2018-054502 |
| Jul. 31, 2018 | (JP) | JP2018-143575 |

(51) Int. Cl.
    *H05B 3/02*     (2006.01)
    *H05B 3/20*     (2006.01)

(56) References Cited

U.S. PATENT DOCUMENTS

| 2016/0111776 A1* | 4/2016 | Okumura | H01Q 1/422 |
| | | | 343/872 |
| 2017/0352938 A1* | 12/2017 | Okumura | H05B 3/267 |
| 2019/0232886 A1* | 8/2019 | Okumura | H01Q 1/42 |
| 2020/0371203 A1* | 11/2020 | Hirotani | H01Q 1/42 |
| 2021/0370849 A1* | 12/2021 | Yamada | H05B 3/286 |

FOREIGN PATENT DOCUMENTS

| JP | 2003-518634 A | 6/2003 |
| JP | 2005-505466 A | 2/2005 |
| JP | 2017-215242 A | 12/2017 |

\* cited by examiner

DECORATIVE COMPONENT FOR VEHICLE

CROSS REFERENCE TO RELATED APPLICATIONS

This application is a divisional of U.S. Utility application Ser. No. 16/640,838 filed on Feb. 21, 2020, which is a national stage application of International Patent Application No. PCT/JP2018/033313 filed on Sep. 7, 2018, which claims priority to Japanese Patent Application No. 2017-188728 filed on Sep. 28, 2017, Japanese Patent Application No. 2017-189704 filed on Sep. 29, 2017, Japanese Patent Application No. 2018-054501 filed on Mar. 22, 2018, Japanese Patent Application No. 2018-054502 filed on Mar. 22, 2018, and Japanese Patent Application No. 2018-143575 filed on Jul. 31, 2018, the contents of which are incorporated herein by reference.

BACKGROUND

The present invention relates to a vehicle decorative component.

In the related art, a heating element may be provided in a decorative component of a vehicle, such as a front garnish. The heating element is provided in order to melt and remove the ice and snow collected on the design surface of the decorative component. For example, the decorative component disclosed in Patent Document 1 has a configuration as an emblem for decorating a front grille. A radio wave transparent region through which a radio wave of a radar device provided in a vehicle passes is set on the design surface of the decorative component. A heating element that generates heat by energization to raise the temperature of the base member that forms the design surface is provided in the decorative component in the conventional example.

That is, the ice and snow collected on the design surface attenuates the radio wave, and thus detection performance of the radar device provided inside the decorative component may be degraded. In view of this point, in the above-described decorative component in the related art, ice and snow in the radio wave transparent region is removed by a temperature rising action of the heating element. Thus, it is possible to ensure high radar detection performance even during snowfall or at time of a low temperature when rainwater collected on the vehicle is likely to freeze.

In the decorative component disclosed in Patent Document 1, a sheet-like heating element configured by holding a heater wire with a sheet material is used. Thus, the handling is facilitated including a step of laying the heating element on the base member.

PRIOR ART DOCUMENT

Patent Document

Patent Document 1: Japanese Laid-Open Patent Publication No. 2017-215242

SUMMARY

However, in a vehicle, reduction of manufacturing costs is promoted along with including improvement of assemblability of all components. It is not possible that the decorative component in the related art may always meet the demand level of such vehicles that evolve every day. For this reason, further improvement has been desired.

Accordingly, it is an objective of the present invention to provide a vehicle decorative component in which it is possible to easily assemble a heating element with a simple configuration.

To achieve the foregoing objective, a vehicle decorative component is provided that includes a heating element configured by stacking first and second sheet materials and interposing a heater wire that generates heat by energization between the first and second sheet materials, a base member including a laying surface for the heating element on a front surface forming a design surface, and a circuit board that includes a power source line forming a power supply path for the heating element and is fixed to a back surface of the base member. The heating element includes a main body portion fixed to the laying surface and an extending portion that includes a power source connection portion for connecting the heater wire to the power source line and extends to the back surface of the base member. The main body portion is fixed to the laying surface by fixing the second sheet material to the base member. The heater wire is exposed in the power source connection portion without stacking the second sheet material on the first sheet material.

According to the above configuration, it is possible to easily fix the main body portion of the heating element to the laying surface, in a state where the heater wire is protected by the first and second sheet materials. In this state, the extending portion wraps around from the front surface of the base member toward the back surface, and thus it is possible to face the power source connection portion, in which the heater wire is exposed, to the circuit board fixed to the back surface of the base member. In the power source connection portion, the second sheet material is not stacked. Thus, it is possible to bring the heater wire into close contact with the power source line provided on the circuit board. As a result, it is possible to easily and reliably connect the heater wire to the power source line. In particular, according to the above configuration, since the adhesion between the heater wire and the power source line is high, it is possible to easily perform soldering in a case where soldering is used for such connections. Thus, it is possible to easily assemble the heating element with a simple configuration.

In the above-described vehicle decorative component, the second sheet material is preferably an adhesive sheet having an adhesive force to the base member.

According to the above configuration, it is possible to easily and reliably fix the heating element to the base member.

In the above-described vehicle decorative component, a hole portion that extends through the first sheet material to expose the heater wire is preferably provided in the power source connection portion.

According to the above configuration, it is possible to more easily and stably connect the heater wire to the power source line.

In the above-described vehicle decorative component, the first and second sheet materials are preferably transparent sheets.

According to the above configuration, it is possible to ensure an excellent design property.

According to the present invention, it is possible to easily assemble the heating element with a simple configuration.

DETAILED DESCRIPTION OF THE PREFERRED EMBODIMENTS

First Embodiment

A vehicle decorative component according to a first embodiment will now be described with reference to FIGS. 1 to 7. The vehicle decorative component is a garnish having a configuration for an emblem of a vehicle.

Figure 1:
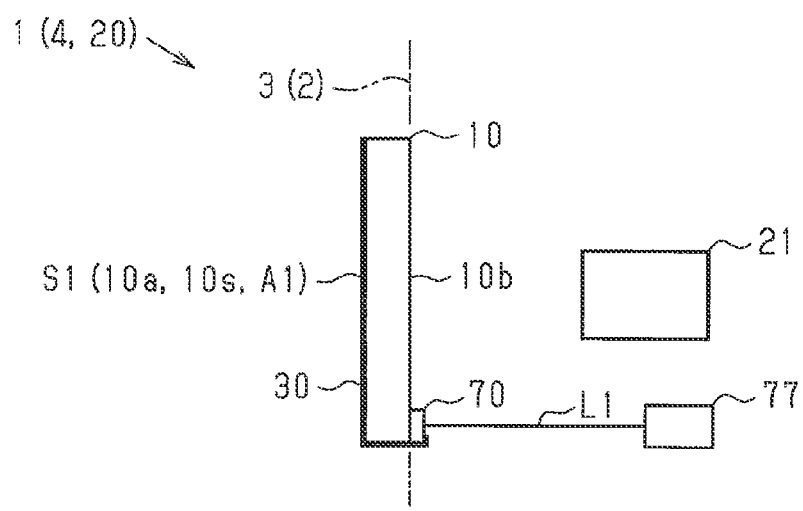
FIG. 1 is a schematic diagram illustrating a garnish provided on the front grille of a vehicle according to a first embodiment.
Figure 2:
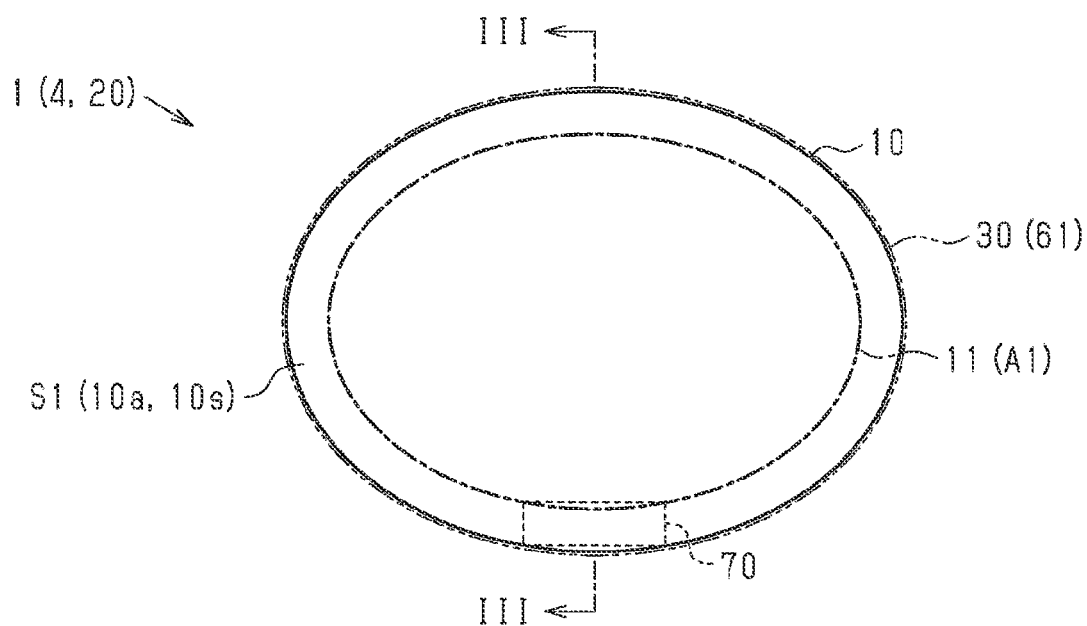
FIG. 2 is a front view illustrating the garnish according to the first embodiment.

As illustrated in FIGS. 1 and 2, a garnish (front garnish) 1 is provided as a vehicle decorative component. The garnish 1 has a configuration as an emblem 4 that decorates a front grille 3 of a vehicle 2. Specifically, in the present embodiment, the garnish 1 includes a base member 10, which is formed in a laterally long elliptical shape and has a substantially flat plate shape. The garnish 1 is fixed to the front grille 3 of the vehicle 2. Thus, a front surface 10a of the base member 10 facing the front of the vehicle 2 (left side in FIG. 1) forms a design surface S1. The garnish 1 has a seal display portion 11 at the center portion of the elliptical design surface S1. A seal of the emblem 4 in which characters or figures are designed is displayed at the seal display portion 11. In the present embodiment, the garnish 1 functions as a radio wave transparent cover 20 by setting the seal display portion 11 in a radio wave transparent region A1.

In detail, as illustrated in FIG. 1, in the present embodiment, the vehicle 2 includes a radar device 21. The radar device 21 is provided inside the front grille 3 and behind a position at which the emblem 4 is provided (on the right side in FIG. 1). That is, the radar device 21 transmits a millimeter wave to the front of the vehicle 2 through the radio wave transparent region A1 set on the design surface S1 of the garnish 1 forming the emblem 4, and receives the reflected wave. Thus, in the present embodiment, the vehicle 2 detects an obstacle existing in front of the vehicle 2 or measures the distance between vehicles.

As illustrated in FIGS. 1 and 2, in the present embodiment, the garnish 1 includes a sheet-like heating element 30. The heating element 30 generates heat by energization, so as to raise the temperature of the base member 10. Specifically, in the present embodiment, in the garnish 1, the heating element 30 is laid on the front surface 10a of the base member 10 forming the design surface S1 of the garnish 1. That is, in the present embodiment, the garnish 1 raises the temperature of the front surface 10a of the base member 10 with the heating element 30. Thus, it is possible to remove ice and snow collected on the design surface S1 having the radio wave transparent region A1.

Figure 3:
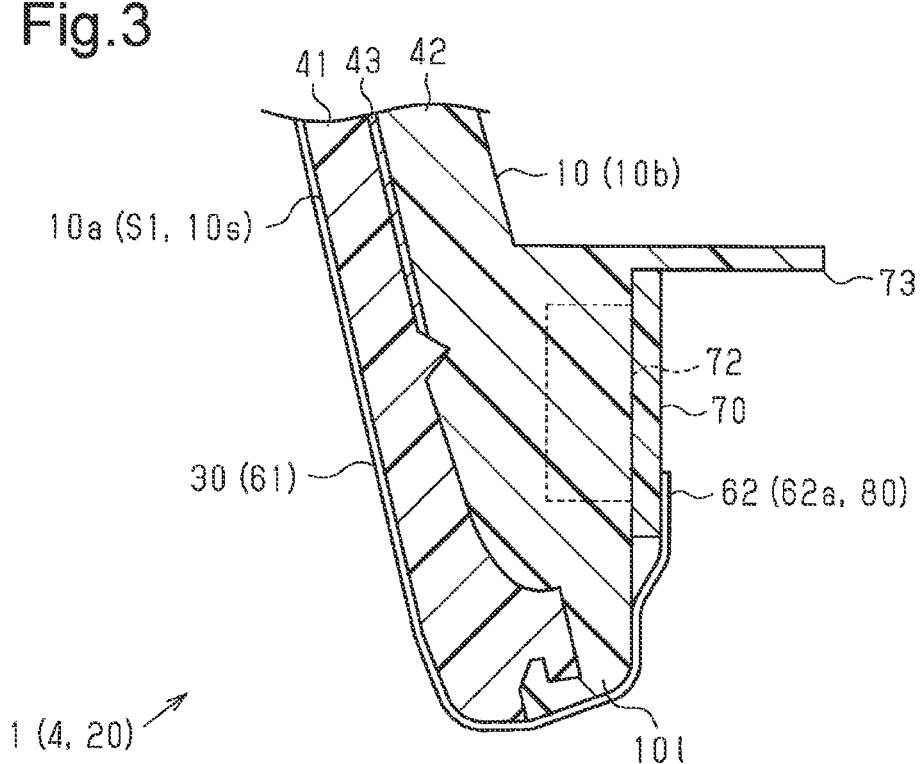
FIG. 3 is a cross-sectional view illustrating the garnish according to the first embodiment cross-section in FIG. 2).

In more detail, as illustrated in FIG. 3, in the present embodiment, in the garnish 1, the base member 10 is configured by stacking a transparent base member 41 and a black base member 42. In the present embodiment, in the garnish 1, the transparent base member 41 forms the front surface 10a of the base member 10, and the black base member 42 forms a back surface 10b of the base member 10. That is, in the garnish 1, the black base member 42 is attached to the front grille 3 of the vehicle 2 in a state where the transparent base member 41 is directed to the front (left side in FIG. 3) of the vehicle (see FIG. 1). The garnish 1 has a decorating layer 43 formed between the transparent base member 41 and the black base member 42. Thus, in the present embodiment, in the garnish 1, it is possible to three-dimensionally display the seal of the emblem 4 inside the design surface S1 formed by the transparent base member 41.

In the present embodiment, in the garnish 1, polycarbonate (PC) is used for the transparent base member 41. A copolymer (AES) is used for the black base member 42. Indium (In) is used for the decorating layer 43. In the present embodiment, in the garnish 1, the base member 10 is formed using such a material having radio wave transparency. Thus, the millimeter wave of the radar device 21 passes through the radio wave transparent region A1 set on the design surface S1.

Figure 4:
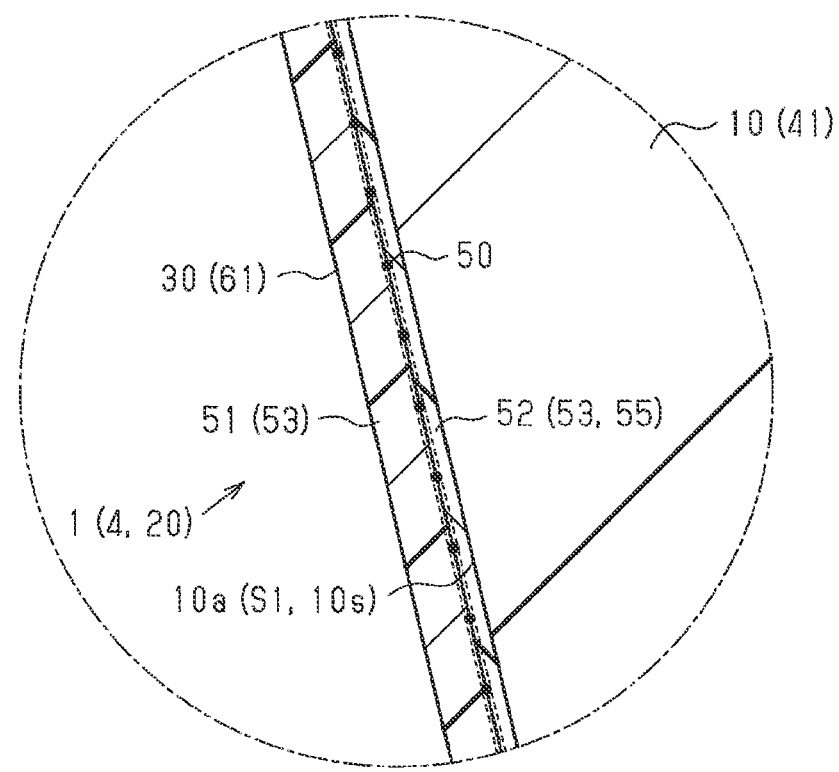
FIG. 4 is a cross-sectional view illustrating a heating element according to the first embodiment.

As illustrated in FIG. 4, in the present embodiment, the heating element 30 includes a heater wire 50 and first and second sheet materials 51 and 52. The heater wire 50 generates heat by energization. The first and second sheet materials 51 and 52 are stacked to interpose the heater wire 50 therebetween.

In the present embodiment, in the heating element 30, the first and second sheet materials 51 and 52 have a configuration as a transparent sheet 53 formed using transparent plastic such as polycarbonate (PC). The second sheet material 52 functions as an adhesive sheet 55 having an adhesive force to the base member 10 (41, 42) of the garnish 1. In the present embodiment, the heating element 30 is fixed to the front surface 10a of the base member 10 by fixing the second sheet material 52 to the front surface 10a of the base member 10 forming the design surface S1 of the garnish 1.

Figure 5:
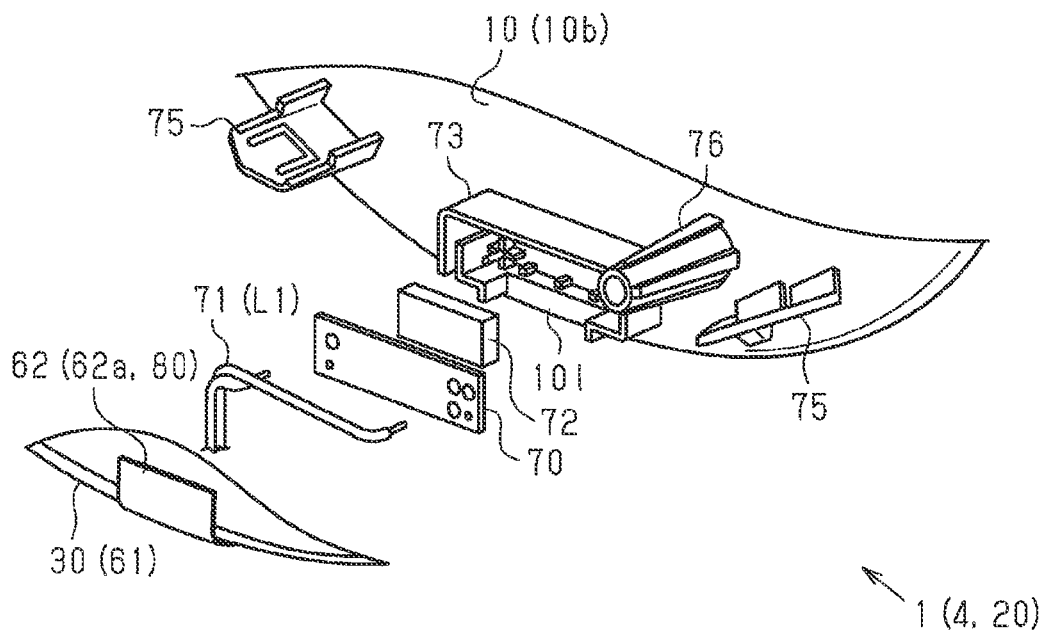
FIG. 5 is an exploded perspective view (rear view) illustrating the garnish according to the first embodiment.

In detail, as illustrated in FIGS. 3 and 5, in the present embodiment, the heating element 30 includes a main body portion 61 and an extending portion 62 extending from the main body portion 61. The main body portion 61 is fixed to the front surface 10a of the base member 10, which is set as a laying surface 10s. In the present embodiment, in the heating element 30, the main body portion 61 is formed in a laterally long elliptical shape which is substantially the same as the front surface 10a of the base member 10 forming the design surface S1. The extending portion 62 extends radially outward from a position of the lower end (see FIG. 2, end portion on the lower side in FIG. 2) of the main body portion 61. The extending portion 62 is disposed to wrap around toward the back surface 10b from the side on which the front surface 10a of the base member 10 to which the main body portion 61 of the heating element 30 is fixed is located. The extending portion 62 is electrically connected to a circuit board (printed board) 70 fixed to the back surface 10b of the base member 10. Thus, in the garnish 1 in the present embodiment, a power supply path L1 for the heating element 30 is established (see FIG. 1).

Figure 6:
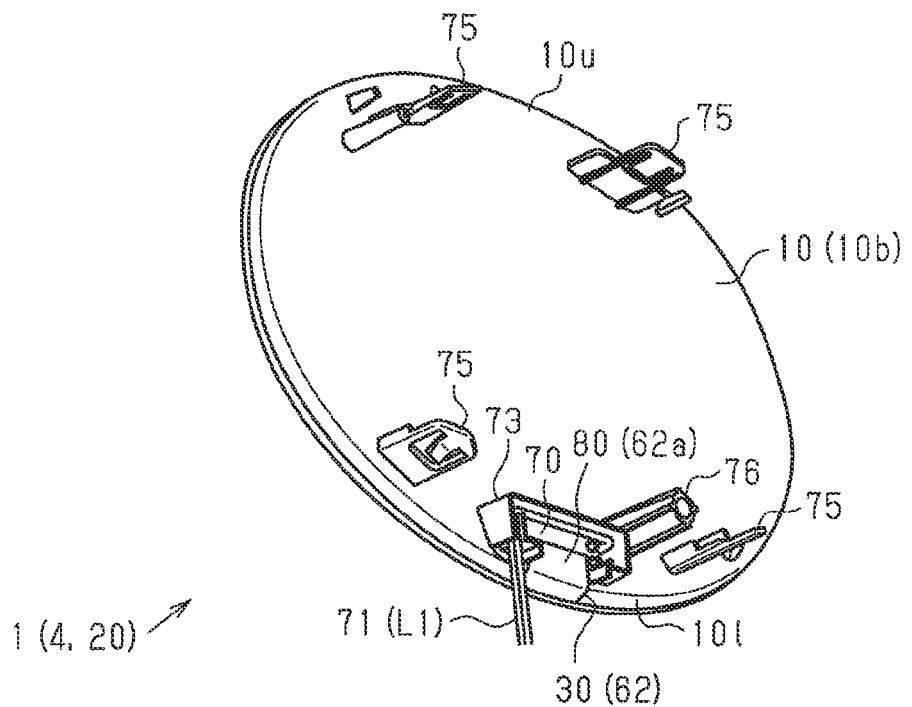
FIG. 6 is a perspective view (rear view) illustrating the garnish according to the first embodiment.

In more detail, as illustrated in FIGS. 5 and 6, in the garnish 1 in the present embodiment, a holding portion 73 holds the circuit board 70. The holding portion 73 is provided on the back surface 10b of the base member 10. In the garnish 1 in the present embodiment, two engagement portions 75 for the front grille 3 are provided at each of an upper end portion 10u and a lower end portion 101 on the back surface 10b of the base member 10. The holding portion 73 of the circuit board 70 is provided between the two engagement portions 75 located at the lower end portion 101. The holding portion 73 is disposed side by side with a screw stop portion 76 for the front grille 3.

Figure 7:
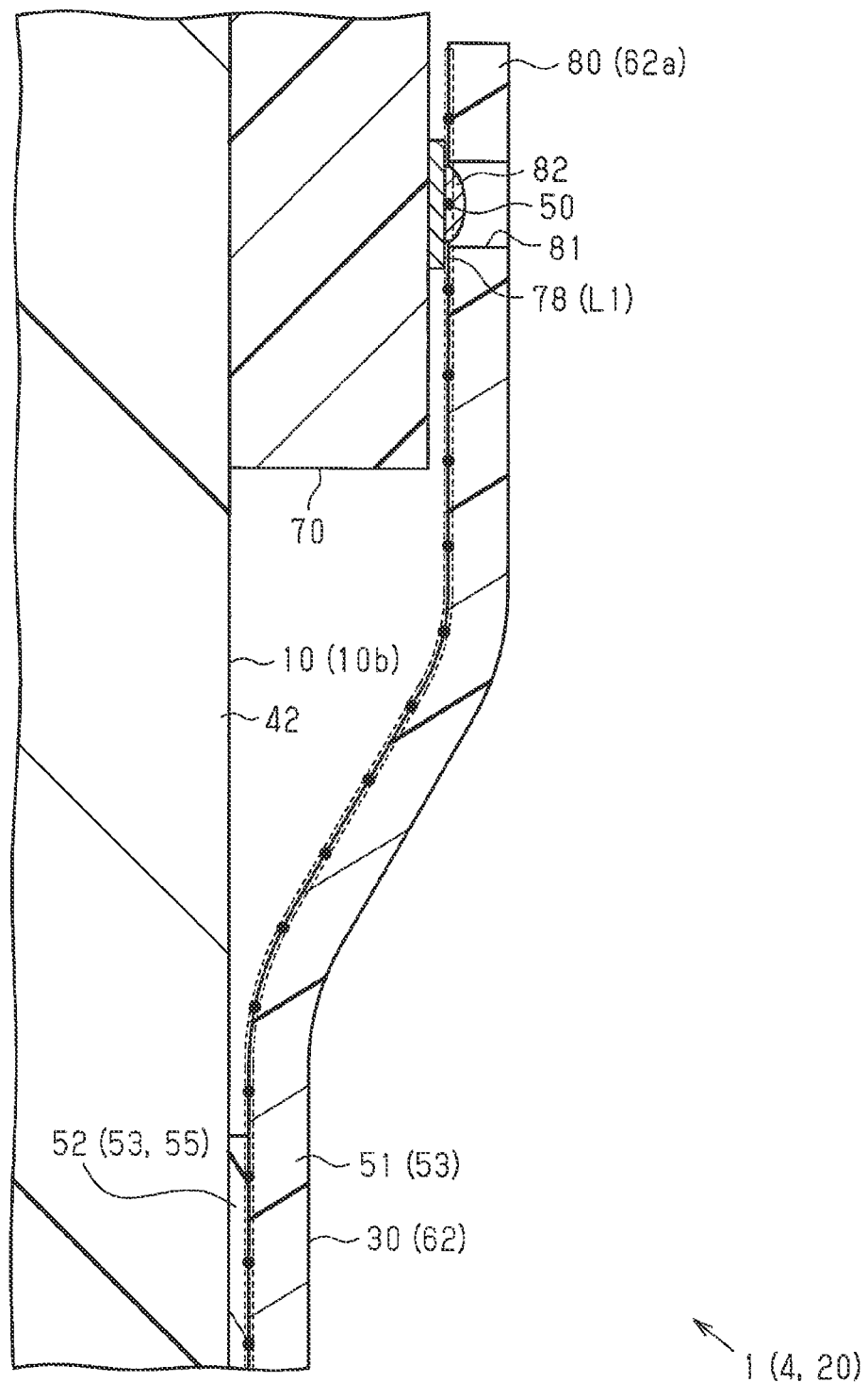
FIG. 7 is an enlarged cross-sectional view illustrating a vicinity of a circuit board fixed to a back surface of a base member according to the first embodiment.

As illustrated in FIG. 7, the heating element 30 in the present embodiment includes a power source connection portion 80 at a tip 62a of the extending portion 62. In the power source connection portion 80, the second sheet material 52 is not stacked on the first sheet material 51, and the heater wire 50 is exposed. The circuit board 70 in the present embodiment includes a power source line 78. The power source line 78 forms the power supply path L1 for the heating element 30 by being connected to a power source 77 of the vehicle through a wire harness 71 (see FIG. 1). In the garnish 1 in the present embodiment, the power source connection portion 80 of the heating element 30 is connected to the circuit board 70 in a state where the heater wire 50 is soldered to the power source line 78.

Specifically, in the heating element 30 in the present embodiment, the extending portion 62 that wraps around toward the back surface 10b of the base member 10 extends toward the circuit board 70 such that the first sheet material 51 is directed toward the rear surface (right side in FIG. 7) of the base member 10. Thus, in the power source connection portion 80 provided at the tip 62a of the extending portion 62, the heater wire 50 exposed on the side (left side in FIG. 7) facing the back surface 10b of the base member 10 is in direct contact with the power source line 78 provided on the circuit board 70.

In the heating element 30 in the present embodiment, a hole portion 81 that extends through the first sheet material 51 and exposes the heater wire 50 is provided in the power source connection portion 80. In the garnish 1 in the present embodiment, the heater wire 50 of the heating element 30 is soldered to the power source line 78 of the circuit board 70 using the hole portion 81.

That is, the heating element 30 in the present embodiment is positioned such that the hole portion 81 provided in the power source connection portion 80 overlaps the circuit board 70. The heater wire 50 and the power source line 78 are soldered to each other through the hole portion 81. Thus, a soldering portion 82 is disposed in the hole portion 81.

A thermostat 72 as an overheating prevention element is mounted on the circuit board 70 in the present embodiment. Thus, in a case where overheating of the base member 10 is detected, energization of the heating element 30 is cut off.

The present embodiment has the following advantages.

(1) The garnish 1 includes the heating element 30, the base member 10, and the circuit board 70. The heating element 30 is configured by stacking the first and second sheet materials 51 and 52 and interposing the heater wire 50 between the first and second sheet materials 51 and 52. The heater wire 50 generates heat by energization. The base member 10 has the laying surface 10s for the heating element 30 on the front surface 10a forming the design surface S1. The circuit board 70 has the power source line 78 that forms the power supply path L1 for the heating element 30 and is fixed to the back surface 10b of the base member 10. The heating element 30 includes the main body portion 61 and the extending portion 62. The main body portion 61 is fixed to the laying surface 10s of the base member 10. The extending portion 62 has the power source connection portion 80 for connecting the heater wire 50 to the power source line 78 and extends toward the back surface 10b of the base member 10. In the heating element 30, the main body portion 61 is fixed to the laying surface 10s by fixing the second sheet material 52 to the base member 10. In the power source connection portion 80, the heater wire 50 is exposed without stacking the second sheet material 52 on the first sheet material 51.

According to the above configuration, it is possible to easily fix the main body portion 61 of the heating element 30 to the laying surface 10s, in a state where the heater wire 50 is protected by the first and second sheet materials 51 and 52. In this state, the extending portion 62 wraps around from the front surface 10a of the base member 10 toward the back surface 10b, and thus it is possible to face the power source connection portion 80 in which the heater wire 50 is exposed, to the circuit board 70 fixed to the back surface 10b of the base member 10. In the power source connection portion 80, the second sheet material 52 is not stacked. Thus, it is possible to bring the heater wire 50 into close contact with the power source line 78 provided on the circuit board 70. As a result, it is possible to easily and reliably connect the heater wire 50 to the power source line 78. In particular, according to the above configuration, since the adhesion between the heater wire 50 and the power source line 78 is high, it is possible to easily perform soldering. Accordingly, it is possible to easily assemble the heating element 30 with a simple configuration.

It is possible to melt and remove ice and snow collected on the design surface S1 of the garnish 1 with high efficiency by setting the front surface 10a of the base member 10 as the laying surface 10s for the heating element 30. It is possible to hide the circuit board 70 and the constituent members of the power supply path L1 such as the wire harness 71, which are connected to the circuit board 70, on the back surface 10b of the base member 10, that is, the rear surface of the garnish 1. Thus, it is possible to ensure the excellent design property and reduce the size in the direction along the design surface S1.

(2) The second sheet material 52 functions as the adhesive sheet 55 having an adhesive force to the base member 10. Thus, it is possible to easily and reliably fix the heating element 30 to the base member 10.

(3) The hole portion 81 that extends through the first sheet material 51 and exposes the heater wire 50 is provided in the power source connection portion 80.

According to the above configuration, it is possible to more easily and stably connect the heater wire 50 to the power source line 78. In particular, when soldering the heater wire 50, it is possible to easily position the power source connection portion 80 and perform a soldering operation from the side on which the first sheet material 51 is located, through the hole portion 81. The soldering portion 82 formed in the above manner is disposed in the hole portion 81. Thus, it is possible to stably maintain a connection state of the heater wire 50 to the power source line 78.

(4) The first and second sheet materials 51 and 52 have a configuration as the transparent sheet 53. Thus, it is possible to ensure the excellent design property.

The embodiment described above may be modified as follows. The above-described embodiment and the following modifications can be combined as long as the combined modifications remain technically consistent with each other.

In the above embodiment, the garnish 1 has a configuration as the emblem 4 that decorates the front grille 3 of the vehicle 2. The seal display portion 11 is set on the design surface S1 of the garnish 1. The seal of the emblem 4 is displayed at the seal display portion 11. The garnish 1 functions as the radio wave transparent cover 20 by setting the seal display portion 11 in the radio wave transparent region A1. The heating element 30 is laid on the front surface 10a of the base member 10, which forms the design surface S1. Thus, it is possible to raise the temperature of the radio wave transparent region A1.

However, the arrangement position as the vehicle decorative component is not limited to the above description. For example, the arrangement position as the vehicle decorative component may be any component such as a rear garnish. The radio wave transparent region A1 does not necessarily need to coincide with the seal display portion 11. The shape of the garnish 1 may be changed to any shape. The garnish 1 does not necessarily need to form the emblem 4 of the vehicle 2. The garnish 1 does not necessarily need to have the function as the radio wave transparent cover 20 as long as the garnish 1 includes the heating element 30 capable of raising the temperature of the base member 10.

In the above embodiment, the base member 10 is configured by stacking the transparent base member 41 and the black base member 42. The decorating layer 43 is provided between the transparent base member 41 and the black base member 42. However, for example, a colored base member other than black, which matches with the body color of the vehicle may be overlapped on the transparent base member 41. The decorating layer 43 does not necessarily need to be provided. The base member 10 may have a single layer structure. The base member 10 does not necessarily need to have transparency.

The transparency of the transparent base member 41 may be changed to any value. That is, for example, a translucent base member 41 may be used as long as the base member 41 has translucency. Similarly, the transparency of each of the sheet materials (51 and 52) of the heating element 30, which have the configuration as the transparent sheet 53 may be changed to any value. For example, each of the sheet materials (51 and 52) may have a configuration of matching with the color of the base member 10 on which the heating element 30 is laid. At least one of the sheet materials (51 and 52) does not necessarily need to have the configuration as the transparent sheet 53.

In the above embodiment, the second sheet material 52 has the function as the adhesive sheet 55 having an adhesive force to the base member 10. However, for example, the second sheet material 52 may be fixed to the base member 10 by heat welding. The second sheet material 52 may be fixed to the base member 10 using an adhesive.

The heating element 30 includes the main body portion 61 and the extending portion 62 extending from the main body portion 61. The main body portion 61 is fixed to the front surface 10a of the base member 10. The extending portion 62 wraps around toward the back surface 10b from the front surface 10a of the base member 10. The power source connection portion 80 is provided at the tip 62a of the extending portion 62. However, the extending portion 62 does not necessarily need to wrap around toward the back surface 10b from the front surface 10a of the base member 10. For example, the extending portion 62 may be routed out in the direction along the front surface 10a of the base member 10. The laying surface 10s for (the main body portion 61 of) the heating element 30 on the base member 10 may be set at a site (for example, back surface of the transparent base member 41) other than the front surface 10a of the base member 10.

In the above embodiment, the garnish 1 includes the circuit board 70 fixed to the back surface 10b of the base member 10. In the heating element 30, the circuit board 70 and the power source connection portion 80 are electrically connected to each other by soldering the heater wire 50 to the power source line 78 provided on the circuit board 70. However, soldering does not necessarily need to be used for the connection of the heater wire 50 to the power source line 78. For example, the power source line 78 and the heater wire 50 may be electrically connected to each other by pressing the heater wire 50 against the power source line 78. The fixing position of the circuit board 70 does not necessarily need to be limited to the back surface 10b of the base member 10. The circuit board 70 does not necessarily need to be used as the constituent member of the power supply path L1 for the heating element 30. For example, a connector member that fits to the tip 62a of the extending portion 62, in which the power source connection portion 80 is provided, may be used. In such a case, the second sheet material 52 does not necessarily need to be fixed to the base member 10. For example, the first sheet material 51 may function as the adhesive sheet 55 and be fixed to the base member 10.

Next, a technical idea that can be obtained from the above embodiment and the modifications will be described.

A vehicle decorative component comprising:
a base member forming a design surface;
a heating element configured by stacking first and second sheet materials and interposing a heater wire that generates heat by energization between the first and second sheet materials, wherein
the heating element includes
a main body portion fixed to the laying surface set on the base member, and
a power source connection portion for connecting the heater wire to a power source line forming a power supply path for the heating element, and in the power source connection portion, the heater wire is exposed without stacking the second sheet material on the first sheet material.

Second Embodiment

A vehicle decorative component according to a second embodiment will now be described with reference to FIGS. 8 to 14. The vehicle decorative component is a garnish having a configuration for an emblem of a vehicle.

Figure 8:
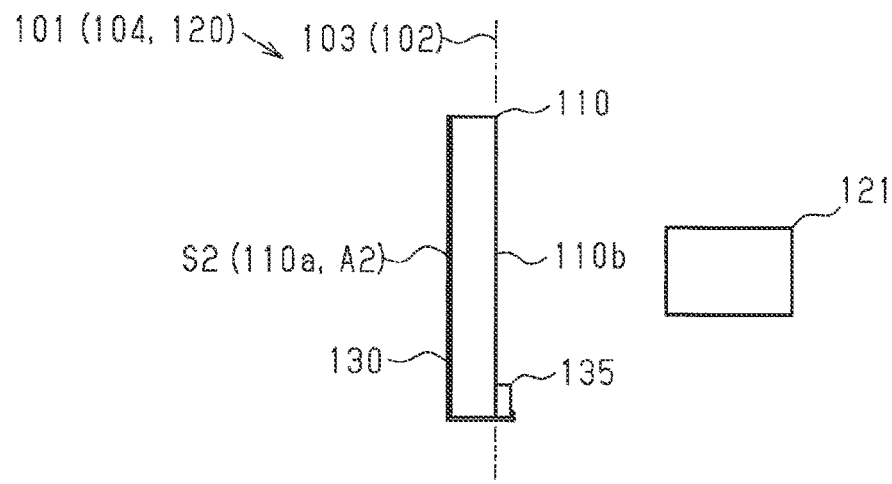
FIG. 8 is a schematic diagram illustrating a garnish provided on a front grille of a vehicle according to a second embodiment.
Figure 9:
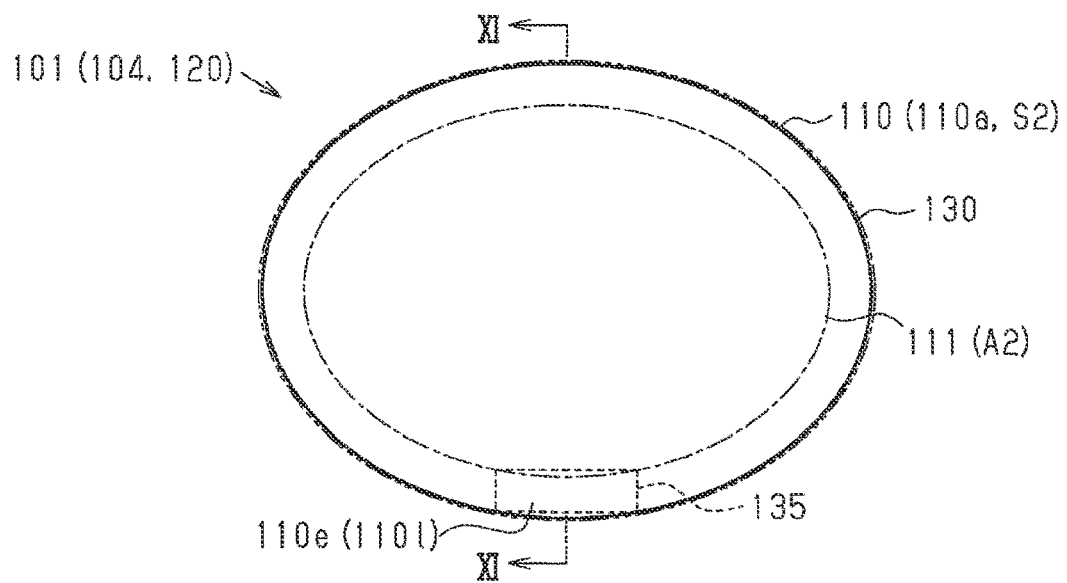
FIG. 9 is a front view illustrating the garnish according to the second embodiment.

As illustrated in FIGS. 8 and 9, a garnish (front garnish) 101 is provided as a vehicle decorative component. The garnish 101 has a configuration as an emblem 104 that decorates a front grille 103 of a vehicle 102. Specifically, in the present embodiment, the garnish 101 includes a base member 110 which is formed in a laterally long elliptical shape and has a substantially flat plate shape. The garnish 101 is fixed to the front grille 103 of the vehicle 102, and thus a front surface 110a of the base member 110 facing the front (left side in FIG. 8) of the vehicle 102 forms a design surface S2. The garnish 101 has a seal display portion 111 at the center portion of the elliptical design surface S2. A seal of the emblem 104 in which characters or figures are designed is displayed at the seal display portion 111. In the present embodiment, the garnish 101 functions as a radio wave transparent cover 120 by setting the seal display portion 111 in a radio wave transparent region A2.

In detail, as illustrated in FIG. 8, in the present embodiment, the vehicle 102 includes a radar device 121. The radar device 121 is provided inside the front grille 103 and behind a position at which the emblem 104 is provided (on the right side in FIG. 8). That is, the radar device 121 transmits a millimeter wave to the front of the vehicle 102 through the radio wave transparent region A2 set on the design surface S2 of the garnish 101 forming the emblem 104, and receives the reflected wave. Thus, in the present embodiment, the vehicle 102 detects an obstacle existing in front of the vehicle 102 or measures the distance between vehicles.

As illustrated in FIGS. 8 and 9, in the present embodiment, the garnish 101 includes a heating element 130. The heating element 130 generates heat by energization, so as to raise the temperature of the base member 110. Specifically, the heating element 130 has a sheet-like outer shape and is configured, for example, by covering a wiring layer formed using copper or the like with a plastic film. In the present embodiment, in the garnish 101, the heating element 130 is laid on the front surface 110a of the base member 110 forming the design surface S2 of the garnish 101. That is, in the present embodiment, the garnish 101 raises the temperature of the front surface 110a of the base member 110 with the heating element 130. Thus, it is possible to remove ice and snow collected on the design surface S2 having the radio wave transparent region A2.

Figure 10:
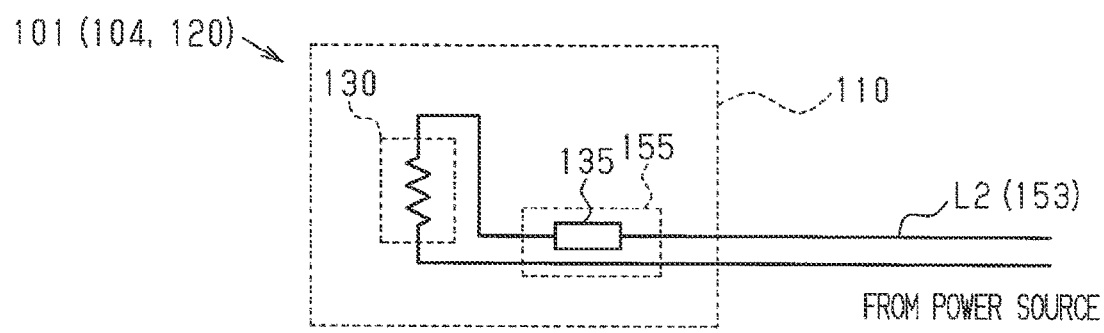
FIG. 10 is a circuit diagram illustrating a heating element and a thermostat that raise a temperature of a base member of the garnish according to the second embodiment.

As illustrated in FIGS. 8 to 10, in the garnish 101 in the present embodiment, a thermostat 135 as an overheating prevention element is provided on the base member 110. Specifically, the thermostat 135 is provided on the back surface 110b of the base member 110. The thermostat 135 is connected in series with the heating element 130 in the power supply path L2 for the heating element 130. The thermostat 135 detects overheating of the base member 110 and stops the energization of the heating element 130. Thus, in the garnish 101 in the present embodiment, it is possible to appropriately maintain the temperature of the base member 110.

Figure 11:
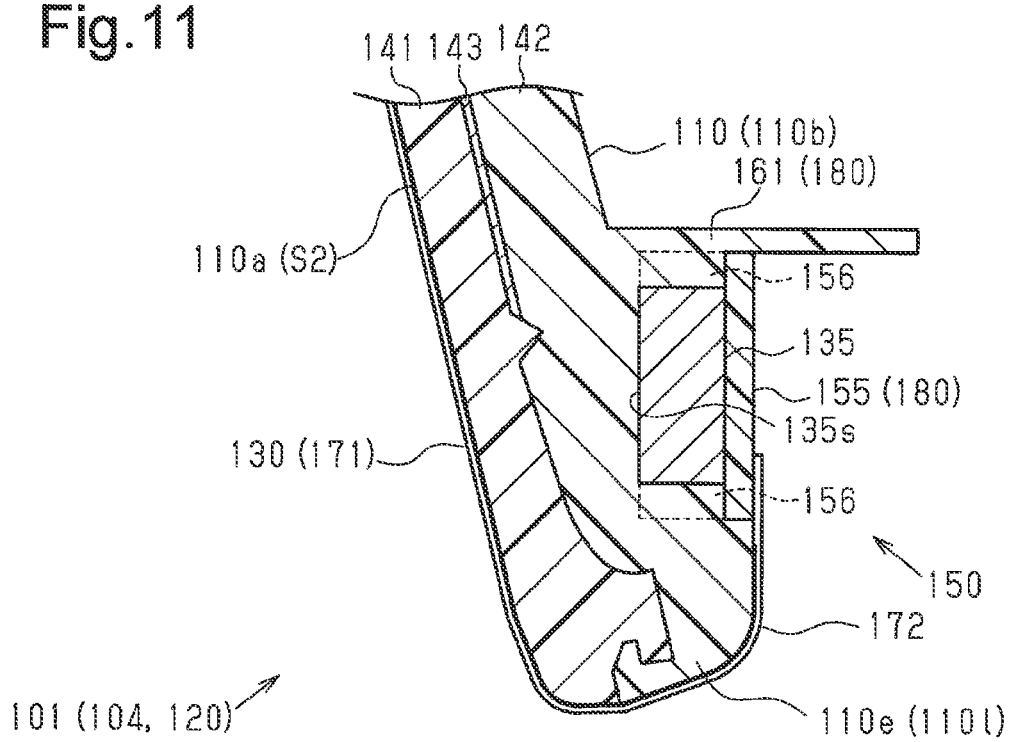
FIG. 11 is a cross-sectional view illustrating the garnish according to the second embodiment (XI-XI cross-section in FIG. 9).

In more detail, as illustrated in FIG. 11, in the present embodiment, in the garnish 101, the base member 110 is configured by stacking a transparent base member 141 and a black base member 142. In the present embodiment, in the garnish 101, the transparent base member 141 forms the front surface 110a of the base member 110, and the black base member 142 forms a back surface 110b of the base member 110. That is, in the garnish 101, the black base member 142 is attached to the front grille 103 of the vehicle 102 in a state where the transparent base member 141 is directed to the front (left side in FIG. 11) of the vehicle (see FIG. 8). The garnish 101 has a decorating layer 143 formed between the transparent base member 141 and the black base member 142. Thus, in the present embodiment, in the garnish 101, it is possible to three-dimensionally display the seal of the emblem 104 inside the design surface S2 formed by the transparent base member 141.

In the present embodiment, in the garnish 101, polycarbonate (PC) is used for the transparent base member 141. A copolymer (AES) is used for the black base member 142.

Indium (In) is used for the decorating layer 143. In the present embodiment, in the garnish 101, the base member 110 is formed using such a material having radio wave transparency. Thus, the millimeter wave of the radar device 121 passes through the radio wave transparent region A2 set on the design surface S2.

Figure 12:
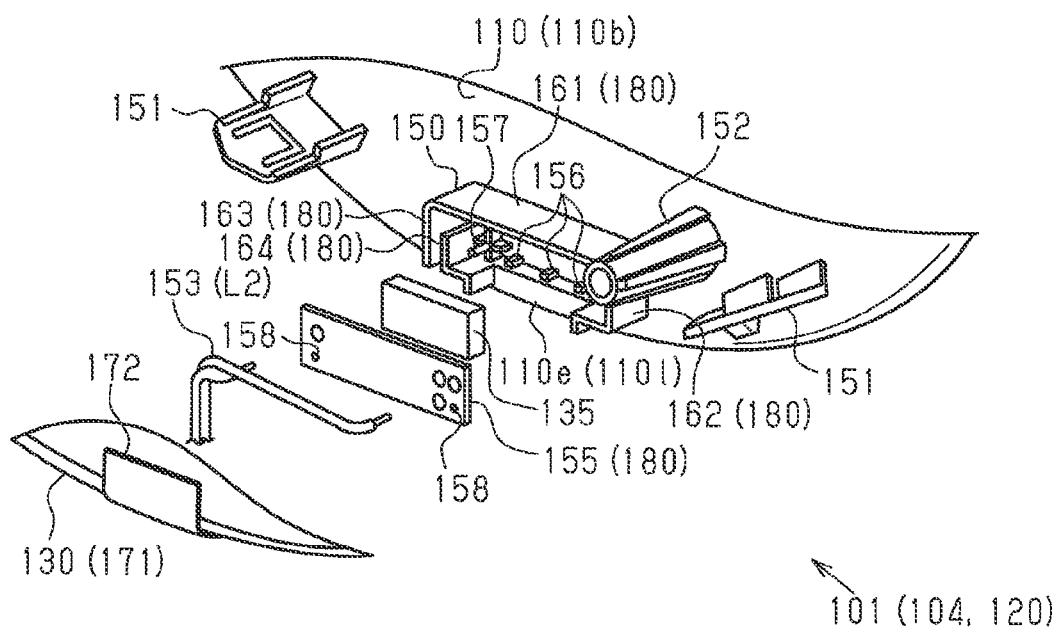
FIG. 12 is an exploded perspective view illustrating the garnish illustrating the thermostat and a holding portion of the thermostat according to the second embodiment.
Figure 13:
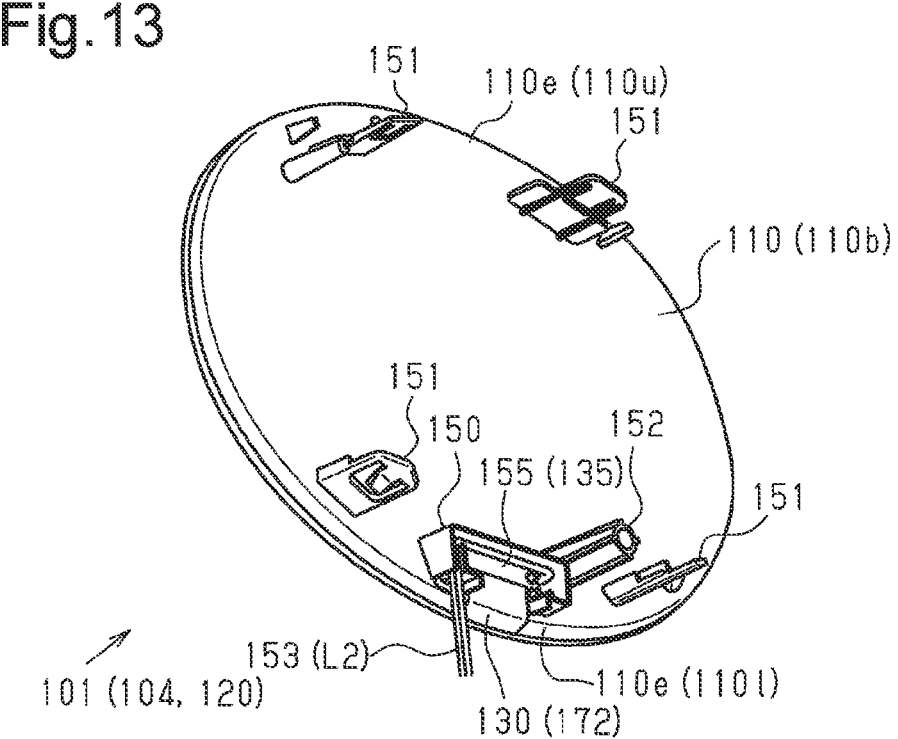
FIG. 13 is a perspective view illustrating a back surface of the garnish, on which the thermostat is provided, according to the second embodiment.

As illustrated in FIGS. 12 and 13, the garnish 101 in the present embodiment includes a holding portion 150 of the thermostat 135 on the back surface 110b of the base member 110, specifically, at a substantially elliptical edge portion 110e. In the garnish 101 in the present embodiment, two engagement portions 151 for the front grille 103 are provided at each of an upper end portion 110u and a lower end portion 110l of an edge portion on the back surface 110b of the base member 110. The holding portion 150 of the thermostat 135 is provided between the two engagement portions 151 located at the lower end portion 110l. The holding portion 150 is disposed side by side with a screw stop portion 152 for the front grille 103.

In the present embodiment, the thermostat 135 has an outer shape that is a substantially rectangular flat plate-like shape. The thermostat 135 is mounted on a printed board 155 along with a wire harness 153 that forms a power supply path L2 for the heating element 130 (see FIG. 10). In the garnish 101 in the present embodiment, the thermostat 135 is held by the holding portion 150 provided on the back surface 110b of the base member 110, so as to be integrated with the printed board 155.

Figure 14:
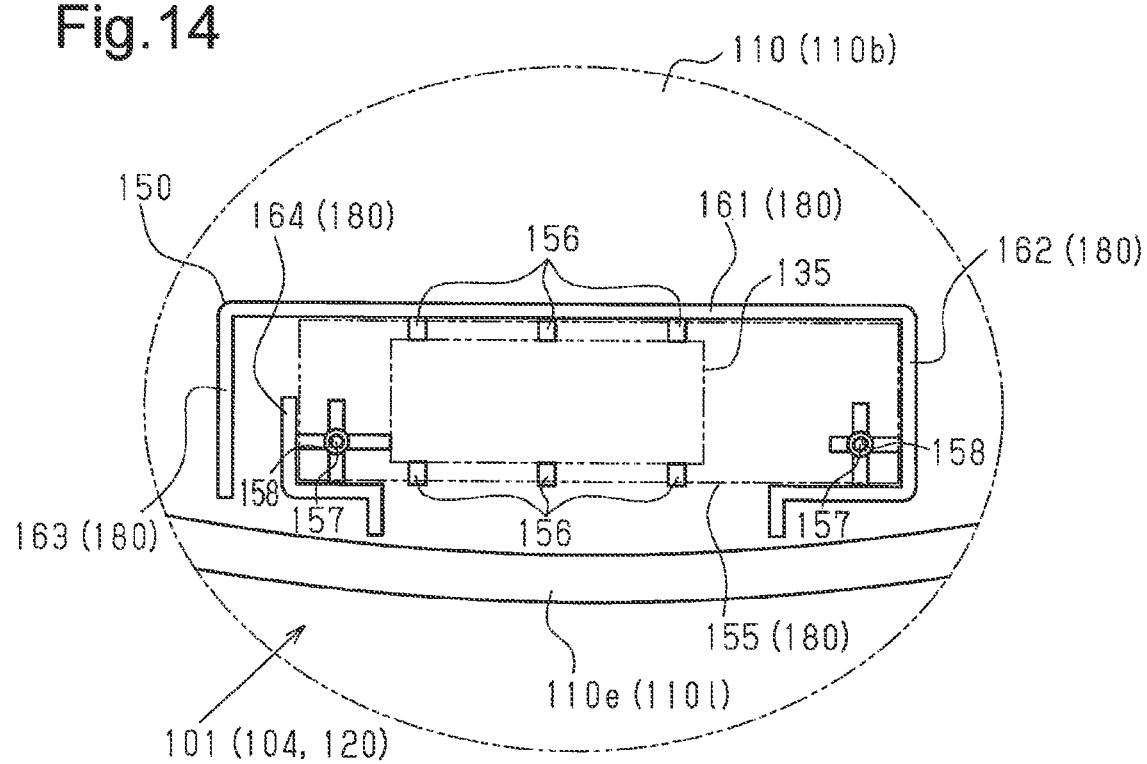
FIG. 14 is a rear view illustrating the garnish illustrating the holding portion of the thermostat according to the second embodiment.

In detail, as illustrated in FIGS. 12 to 14, the thermostat 135 in the present embodiment is mounted on the printed board 155 such that the plate-like main surfaces of the thermostat 135 and the printed board 155 are substantially parallel to each other. The thermostat 135 is assembled with the holding portion 150 provided on the back surface 110b of the base member 110 so as to be integrated with the printed board 155 and the wire harness 153, such that the flat-like main surface of the thermostat 135 is substantially parallel to the back surface 110b of the base member 110. In the thermostat 135 in the present embodiment, a first flat surface 135s facing in a direction (see FIG. 11, left direction in FIG. 11) from the back surface 110b of the base member 110 toward the front surface 110a has highest heat sensing accuracy.

In the present embodiment, the holding portion 150 includes a plurality of ribs 156 that interpose the thermostat 135 therebetween in an up-down direction in this state (see FIG. 11). A plurality (two in the present embodiment) of fixation pins 157 protruding from the back surface 110b of the base member 110 are provided in the holding portion 150. A plurality of through-holes 158 into which the corresponding fixation pins 157 are inserted are provided in the printed board 155.

In the holding portion 150, the tip of the fixation pin 157 can be fastened by applying heat to the tip portion of the fixation pin 157 inserted into the through-hole 158 in the printed board 155 so as to melt the tip portion of the fixation pin 157. Thus, in the garnish 101 in the present embodiment, the thermostat 135 is fixed to the holding portion 150 so as to be integrated with the printed board 155.

As illustrated in FIG. 14, the holding portion 150 in the present embodiment has an upper wall portion 161 extending in a width direction (left-right direction in FIG. 14) of the base member 110. The upper wall portion 161 is provided above the ribs 156 arranged in two upper and lower stages. Each stage of the ribs 156 includes a plurality of ribs 156 arranged in the width direction. The holding portion 150 includes a pair of side wall portions 162 and 163 on the outside of the rib 156 in the width direction. The pair of side wall portions 162 and 163 extend in an up-down direction (up-down direction in FIG. 14) continuously to the upper wall portion 161. An auxiliary wall 164 extending in the up-down direction of the base member 110 is provided beside one of the side wall portions 162 and 163. The auxiliary wall 164 is disposed at a position (right side in FIG. 14) closer to the rib 156 than the side wall portion 163 in the width direction. In the holding portion 150 in the present embodiment, the wire harness 153 extending from the printed board 155 is routed downward from a gap between the auxiliary wall 164 and the side wall portion 163.

As illustrated in FIG. 11, the heating element 130 in the present embodiment is laid on the front surface 110a of the base member 110, which forms the design surface S2, by heat welding of a plastic film forming a sheet shape. The heating element 130 in the present embodiment includes a main body portion 171 and an extending portion 172. The main body portion 171 is fixed to the front surface 110a of the base member 110. The extending portion 172 extends radially outward from the main body portion 171 so as to form a connection portion for the power supply path L2. The main body portion 171 is fixed to the front surface 110a of the base member 110 in a state where the extending portion 172 is directed downward (lower side in FIG. 11). In the heating element 130 in the present embodiment, the extending portion 172 is disposed to wrap around toward the back surface 110b from the front surface 110a of the base member 110, at an edge position of the base member 110 at which the holding portion 150 of the thermostat 135 is provided, that is, in the lower end portion 110l of the base member 110.

That is, the garnish 101 in the present embodiment includes the heating element 130 on sides (left side and lower side in FIG. 11) corresponding to the front of the vehicle and to the lower side of the vehicle when viewed from the thermostat 135 provided on the back surface 110b of the base member 110. Thus, the heating element 130 wraps the lower end portion 110l of the base member 110 at which the thermostat 135 is provided, from the lower side. Therefore, the thermostat 135 can detect overheating of the base member 110 with high accuracy.

The garnish 101 in the present embodiment has the upper wall portion 161 of the holding portion 150 on the upper side (see FIG. 14, upper side in FIG. 14) when viewed from the thermostat 135 held at the lower end portion 110l of the back surface 110b of the base member 110. The side wall portions 162 and 163 (auxiliary wall 164) of the holding portion 150 are disposed on the opposite sides of the upper wall portion 161 in the width direction (left-right direction in FIG. 14), respectively. The printed board 155 is disposed on the side (right side in FIG. 11) of the upper wall portion 161, which corresponds to the vehicle. That is, when viewed from the thermostat 135, wall members 180 adjacent to the thermostat 135 are disposed in four directions in which the heating element 130 is not located, respectively. In the garnish 101 in the present embodiment, the wall members 180 surround the thermostat 135 as described above. Thus, the thermostat 135 can detect overheating of the base member 110 with higher accuracy.

The present embodiment has the following advantages.

In the related art, there is a decorative component of a vehicle that includes a heating element for melting and removing ice and snow collected on a design surface (for example, Japanese Laid-Open Patent Publication No. 2017-215242).

In many of such decorative components in the related art, energization of the heating element is controlled by a control device provided in the vehicle. Thus, the temperature of the base member is maintained appropriately.

However, in a case where energization of the heating element is controlled outside the decorative component as described above, there is a possibility that it is not possible to appropriately maintain the temperature of the base member, for example, due to a problem of the control device or a short circuit between the wirings. Thus, reliability of the decorative component may be degraded.

To solve the above problem, a vehicle decorative component includes a base member, a heating element, and an overheating prevention element. The base member forms a design surface. The heating element generates heat by energization so as to raise the temperature of the base member. The overheating prevention element detects overheating of the base member and stops the energization of the heating element.

According to the above configuration, for example, even though a situation in which current continues to flow in the heating element by short circuit failure of the wiring occurs, the overheating prevention element can detect overheating of the base member due to the occurrence of the situation, and cut off the energization of the heating element. Thus, it is possible to ensure high reliability by appropriately maintaining the temperature of the base member.

In the vehicle decorative component to solve the above problem, preferably, the heating element is laid on the front surface of the base member forming the design surface, and the overheating prevention element is provided on the back surface of the base member.

According to the above configuration, it is possible to rapidly melt and remove ice and snow collected on the design surface with high efficiency by raising the temperature of the design surface. In the above configuration, the overheating prevention element detects the temperature rise of the base member, on the back side of the position at which the heating element is provided. Thus, it is possible to avoid an excessive operation of the overheating prevention element, that is, the occurrence of a situation in which stop and start of the energization are frequently repeated. Accordingly, it is possible to ensure higher reliability. In addition, it is possible to ensure a high design property by hiding an overheating prevention member on the back side of the base member.

In the vehicle decorative component to solve the above problem, preferably, the overheating prevention element is provided at the edge portion of the base member, and the heating element is provided at the edge position at which the overheating prevention element is provided, so as to wrap around toward the back surface from the front surface of the base member.

According to the above configuration, the heating element wraps the edge position of the base member, in which the overheating prevention element is provided. Thus, it is possible to detect overheating of the base member with high accuracy.

The vehicle decorative component to solve the above problem preferably includes the wall member adjacent to the overheating prevention element in the direction in which the heating element is not located when viewed from the overheating prevention element.

According to the above configuration, it is possible to detect overheating of the base member with higher accuracy.

In the vehicle decorative component to solve the above problem, preferably, the radio wave transparent region is set on the design surface, and the heating element is configured to be capable of raising the temperature of the radio wave transparent region.

According to the above configuration, it is possible to melt and remove ice and snow collected on the radio wave transparent region. Thus, for example, it is possible to avoid attenuation of radio waves (such as millimeter waves of the radar device provided in the vehicle) transmitted and received through the radio wave transparent region, due to ice and snow collected on the design surface.

The advantages of the present embodiment will now be described in more detail.

(1) The garnish 101 as the vehicle decorative component includes the base member 110, the heating element 130, and the thermostat 135 as the overheating prevention element. The base member 110 forms the design surface S2. The heating element 130 generates heat by energization, so as to raise the temperature of the base member 110. The thermostat 135 detects overheating of the base member 110 and stops the energization of the heating element 130.

According to the above configuration, for example, even though a situation in which current continues to flow in the heating element 130 by short circuit failure of the wiring occurs, the thermostat 135 detects overheating of the base member 110 due to the occurrence of the situation, and stops the energization of the heating element 130. Thus, it is possible to ensure high reliability by appropriately maintaining the temperature of the base member 110.

(2) The heating element 130 is laid on the front surface 110*a* of the base member 110, which forms the design surface S2. The thermostat 135 is provided on the back surface 110*b* of the base member 110.

According to the above configuration, it is possible to rapidly melt and remove ice and snow collected on the design surface S2 with high efficiency by raising the temperature of the design surface S2. In the above configuration, the thermostat 135 detects the temperature rise of the base member 110, on the back side of the position at which the heating element 130 is provided. Thus, it is possible to avoid an excessive operation of the thermostat 135, that is, the occurrence of a situation in which stop and start of the energization are frequently repeated. Accordingly, it is possible to ensure higher reliability. In addition, it is possible to ensure a high design property by hiding the thermostat 135 on the back side of the base member 110.

(3) The thermostat 135 is provided at the lower end portion 110*l* being the edge portion 110*e* of the base member 110 on the back surface 110*b* of the base member 110. The heating element 130 is provided at the edge position at which the thermostat 135 is provided, that is, at the lower end portion 110*l* of the base member 110, so as to wrap around toward the back surface 110*b* from the front surface 110*a*.

According to the above configuration, when viewed from the thermostat 135 provided on the back surface 110*b* of the base member 110, the heating element 130 is located on the side corresponding to the front of the vehicle, at which the design surface S2 is located and on the side corresponding to the lower side of the vehicle. Thus, the heating element 130 wraps the lower end portion 110*l* of the base member 110 at which the thermostat 135 is provided, from the lower side. Accordingly, it is possible to detect overheating of the base member 110 with high accuracy.

(4) The wall members 180 (155 and 161 to 164) adjacent to the thermostat 135 are provided in the direction in which the heating element 130 is not located when viewed from the thermostat 135. Thus, it is possible to detect overheating of the base member 110 with higher accuracy.

(5) The radio wave transparent region A2 is set on the design surface S2. The heating element 130 is configured to be capable of raising the temperature of the radio wave transparent region A2.

According to the above configuration, it is possible to melt and remove ice and snow collected on the radio wave transparent region A2. Thus, for example, it is possible to avoid attenuation of radio waves (such as millimeter waves of the radar device 121 provided inside the front grille 103) transmitted and received through the radio wave transparent region A2, due to ice and snow collected on the design surface S2.

The embodiment described above may be modified as follows. The above-described embodiment and the following modifications can be combined as long as the combined modifications remain technically consistent with each other.

In the above embodiment, the base member 110 is configured by stacking the transparent base member 141 and the black base member 142. The decorating layer 143 is provided between the transparent base member 141 and the black base member 142. However, for example, a colored base member other than black, which matches with the body color of the vehicle may be overlapped on the transparent base member 141. The decorating layer 143 does not necessarily need to be provided. The base member 110 may have a single layer structure.

In the above embodiment, the garnish 101 has a configuration as the emblem 104 that decorates the front grille 103 of the vehicle 102. The seal display portion 111 is set on the design surface S2 of the garnish 101. The seal of the emblem 104 is displayed at the seal display portion 111. The garnish 101 functions as the radio wave transparent cover 120 by setting the seal display portion 111 in the radio wave transparent region A2. The heating element 130 is laid on the front surface 110a of the base member 110, which forms the design surface S2. Thus, it is possible to raise the temperature of the radio wave transparent region A2.

However, the arrangement position as the vehicle decorative component is not limited to the above description. For example, the arrangement position as the vehicle decorative component may be any component such as a rear garnish. The radio wave transparent region A2 does not necessarily need to coincide with the seal display portion 111. The shape of the garnish 101 may be changed to any shape. The garnish 101 does not necessarily need to form the emblem 104 of the vehicle 102. The garnish 101 does not necessarily need to have the function as the radio wave transparent cover 120 as long as the garnish 101 includes the heating element 130 capable of raising the temperature of the base member 110.

In the above embodiment, the heating element 130 has a sheet-like outer shape. The heating element 130 is laid on the front surface 110a of the base member 110. The thermostat 135 is provided on the back surface 110b of the base member 110. However, for example, the heating element 130 may be buried in the base member 110 by interposing the heating element 130 between the transparent base member 141 and the black base member 142. The heating element 130 may be provided on the back surface 110b of the base member 110. The heating element 130 may be configured by combining a heat generating unit that generates heat by energization and a heat conductive unit that conducts the heat generated by the heat generating unit.

The position at which the thermostat 135 is provided may be changed to any position. For example, in the above embodiment, the thermostat 135 is provided at the lower end portion 110l on the back surface 110b of the base member 110. However, the edge position of the base member 110, at which the thermostat 135 is provided, may be changed to any position such as the upper end portion 110u. The shape of the heating element 130 and the type of the thermostat 135 (shape, heat-sensitive directivity, and the like) may be changed to any shape and any type.

The heating element 130 includes a main body portion 171 and an extending portion 172 extending radially outward from the main body portion 171. The main body portion 171 is fixed to the front surface 110a of the base member 110. The extending portion 172 is provided to wrap around toward the back surface 110b from the front surface 110a of the base member 110, at the lower end portion 110l (edge position) of the base member 110, at which the thermostat 135 is provided. Thus, when viewed from the thermostat 135 provided on the back surface 110b of the base member 110, the heating element 130 is located on the side corresponding to the front of the vehicle, in which the design surface S2 is located and on the side corresponding to the lower side.

However, for example, when viewed from the thermostat 135, the extending portion 172 may be disposed to wrap around to the position at which the heating element 130 is disposed behind the vehicle. When viewed from the thermostat 135, the heating element 130 may be disposed to wrap around such that the heating element 130 is also located in the width direction. That is, preferably, the heating elements 130 is disposed in at least two directions in total, that is, a first direction intersecting with the design surface S2 and a second direction intersecting with the first direction. Thus, the heating element 130 may be located in three or more directions when viewed from the thermostat 135. The heating element 130 does not necessarily need to have a portion such as the extending portion 172, that wraps around toward the back surface 110b from the front surface 110a of the base member 110.

In the above embodiment, the wall members 180 (155 and 161 to 164) adjacent to the thermostat 135 in four directions corresponding to the upper side, the opposite sides in the width direction, and the rear side of the vehicle when viewed from the thermostat 135, that is, directions in which the heating element 130 is not disposed, respectively. However, when viewed from the thermostat 135, there may be a direction in which the heating element 130 is not located, and the adjacent wall member 180 is not provided. The wall member 180 adjacent to the thermostat 135 does not necessarily need to be provided.

There may be a position at which overheating easily occurs in the base member 110 by energization of the heating element 130. Examples of such a position include a place in which the sheet shape of the heating element 130 is bent and a place at which wiring density is high. In this case, the thermostat may be provided at this position. Thus, it is possible to detect overheating of the base member 110 with high accuracy.

The heating element 130 may be configured by combining a heat generating unit that generates heat by energization and a heat conductive unit that conducts the heat generated by the heat generating unit.

Third Embodiment

A connection structure of a heat generation sheet according to a third embodiment will now be described with reference to FIGS. 15 to 22.

Firstly, an overall configuration of a vehicle to which a radio wave transparent cover in which a heat generation sheet in the present embodiment is applied will be described.

Figure 15:
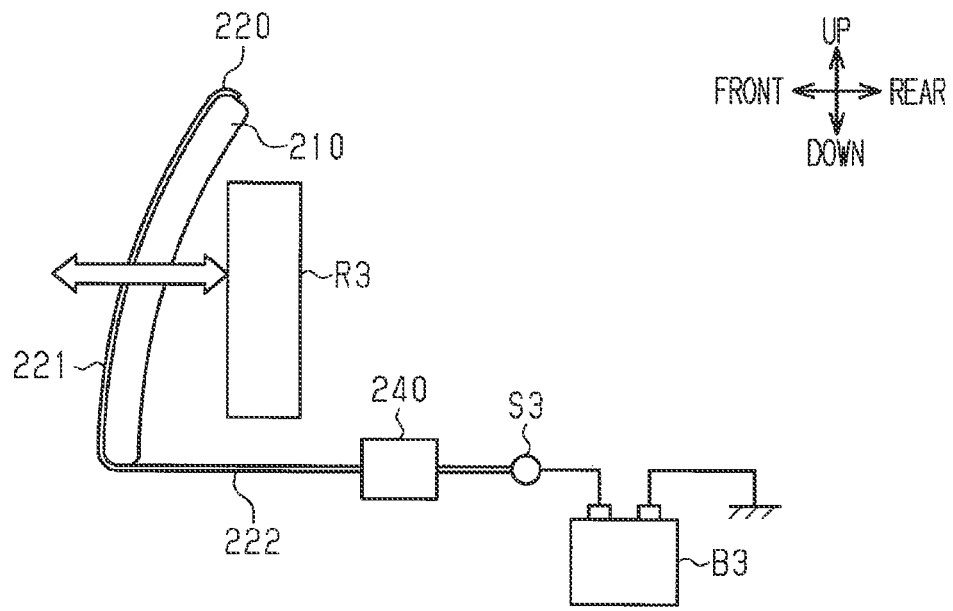
FIG. 15 is a schematic diagram illustrating a schematic configuration of a vehicle to which a radio wave transparent cover is applied, according to a third embodiment.

As illustrated in FIG. 15, a radio wave radar device R3 is mounted on the front of a vehicle. As indicated by an arrow in FIG. 15, the radio wave radar device R3 detects the surrounding conditions of the vehicle by radiating radio waves (millimeter waves) toward the front (left side of FIG. 15) of the vehicle and measuring the reflected waves.

Figure 16:
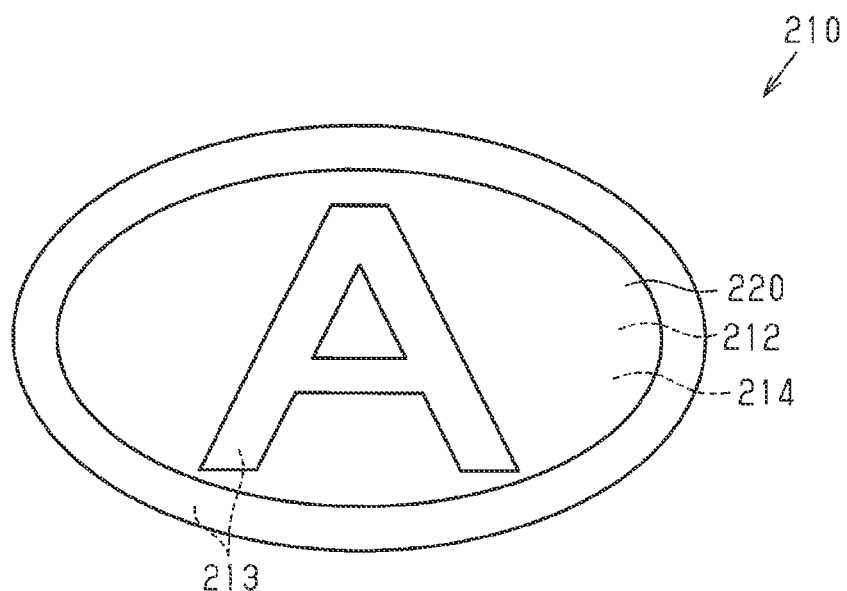
FIG. 16 is a front view illustrating the radio wave transparent cover according to the third embodiment.

As illustrated in FIGS. 15 and 16, a radio wave transparent cover 210 is attached to the front of the vehicle. The radio wave transparent cover 210 is an exterior component (so-called emblem) in which a portion far from the radio wave radar device R3, that is, a portion on the side (left side in FIG. 15 and front side of the paper surface in FIG. 16) near to the outside of the vehicle is set as an outer wall portion and a design portion of the vehicle. The radio wave transparent cover 210 has a substantially elliptical plate shape. The radio wave transparent cover 210 is disposed in front of the radio wave radar device R3 to block a radio wave path (arrow in FIG. 15) of the radio wave radar device R3. With the radio wave transparent cover 210, the radio wave radar device R3 is hidden from the outside of the vehicle.

Next, the structure of the radio wave transparent cover 210 will be described.

Figure 17:
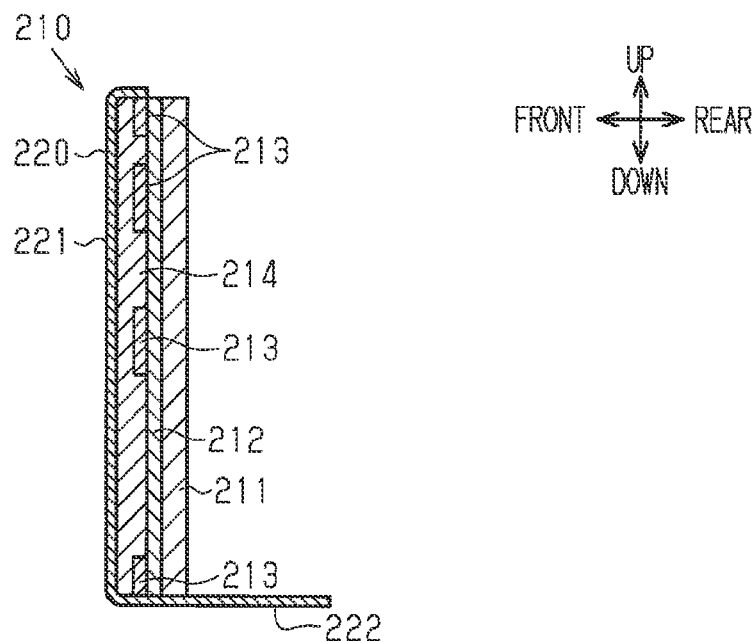
FIG. 17 is a cross-sectional side view illustrating the radio wave transparent cover according to the third embodiment.

As illustrated in FIG. 17, the radio wave transparent cover 210 has a multilayer structure in which an inner surface covering plate 211, a coating layer 212, a metal film layer 213, and an outer surface covering plate 214 are arranged in order from the side (right side in FIG. 17) closer to the inside of the vehicle. In FIG. 17, for easy understanding, the thickness of the coating layer 212 and the thickness of the metal film layer 213 are exaggerated from the actual thickness.

The inner surface covering plate 211 is formed of acrylonitrile-ethylene-styrene plastic (AES plastic). The coating layer 212 is formed of a black acrylic coating material. The metal film layer 213 is an island-like film made of indium. The outer surface covering plate 214 is formed of transparent polycarbonate plastic (PC plastic).

All the AES plastic (inner surface covering plate 211), the acrylic coating material (coating layer 212), and the PC plastic (outer surface covering plate 214) are materials having radio wave transparency for allowing radio waves to pass through. The island-like film (metal film layer 213) made of indium has radio wave transparency for allowing radio waves to pass through. Thus, all of the inner surface covering plate 211, the coating layer 212, the metal film layer 213, and the outer surface covering plate 214 of the radio wave transparent cover 210 have radio wave transparency for allowing radio waves to pass through.

A heat generation sheet 220 provided on the side of the radio wave transparent cover 210 that is close to the outside of the vehicle is formed of transparent polycarbonate plastic (PC plastic). An electric heating wire 230 described later is mounted in the heat generation sheet 220.

The radio wave transparent cover 210 has a structure in which the black coating layer 212, the metal-colored metal film layer 213, and the transparent outer surface covering plate 214 are stacked in order from the side closer to the inside of the vehicle. The transparent heat generation sheet 220 is stacked on the side of the radio wave transparent cover 210 that is close to the outside of the vehicle. Therefore, as illustrated in FIG. 16, in the radio wave transparent cover 210, in a case of being viewed from the outside of the vehicle, a pattern (outer frame and character A in the present embodiment) of a metallic color (metal film layer 213) on a black background (coating layer 212) can be visually recognized.

As illustrated in FIGS. 15, 17, 18A, and 18B, the heat generation sheet 220 in which the electric heating wire 230 is mounted is provided on the side (left side in FIG. 17) of the radio wave transparent cover 210 that is close to the outside of the vehicle. The heat generation sheet 220 is connected to a connector 240 at the tip portion (right side in FIGS. 15 and 17). The connector 240 is connected to a storage battery B3 through a switch S3. If the switch S3 is turned on, the electric heating wire 230 is energized, and thus the heat generation sheet 220 generates heat.

The heat generation sheet 220 is formed of transparent polycarbonate plastic (PC plastic). The pattern of the radio wave transparent cover 210 disposed on the side close to the inside of the vehicle can be visually recognized through the heat generation sheet 220. The heat generation sheet 220 has radio wave transparency for allowing radio waves to pass through.

Next, the structure of the heat generation sheet 220 will be described.

Figure 19:
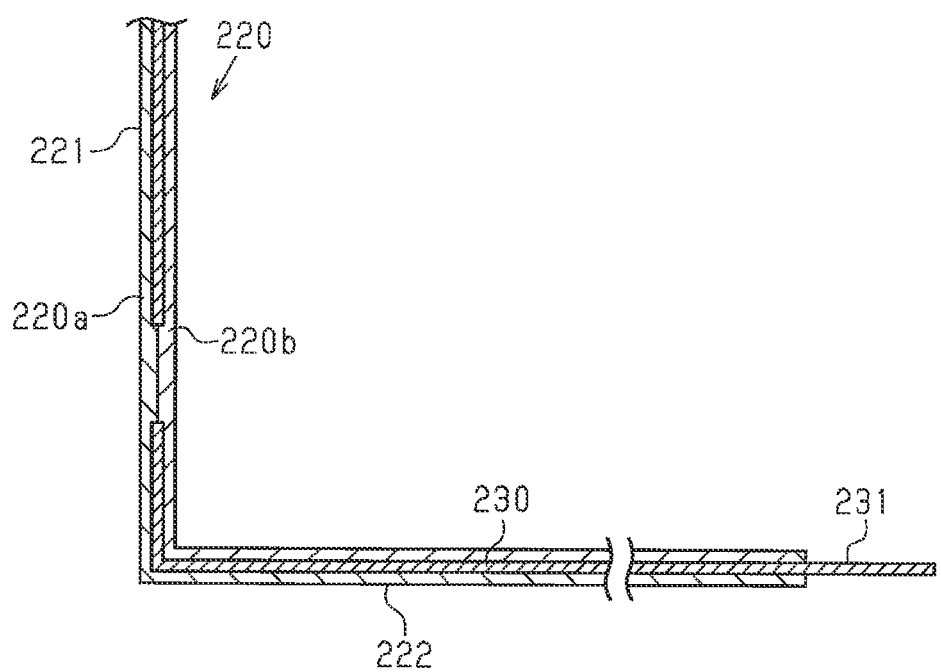
FIG. 19 is a partial cross-sectional view illustrating the heat generation sheet according to the third embodiment, and is a cross-sectional view taken along line XIX-XIX in FIG. 18A.

As illustrated in FIGS. 15, 17, and 19, the heat generation sheet 220 includes a main body portion 221 and an extension portion 222. The main body portion 221 is disposed to cover the front surface (outer surface of the vehicle) of the radio wave transparent cover 210. The extension portion 222 extends from the main body portion 221 and is disposed from the outer edge of the radio wave transparent cover 210 toward the back surface of the radio wave transparent cover 210. The entirety of the radio wave transparent cover 210 on the side close to the outside of the vehicle is covered by the main body portion 221 of the heat generation sheet 220. The tip of the extension portion 222 reaches the inside of the vehicle on the side of the radio wave transparent cover 210 that is close to the inside of the vehicle.

Figure 18A:
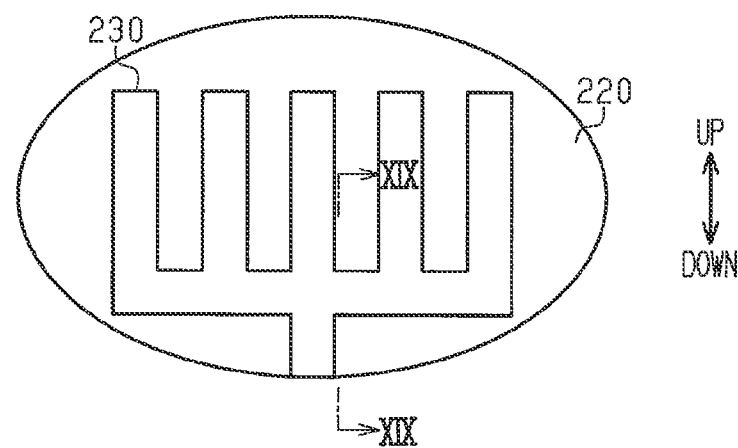
FIG. 18A is a schematic diagram (front view) illustrating the wiring of an electric heating wire in a heat generation sheet provided in the radio wave transparent cover according to the third embodiment.
Figure 18B:
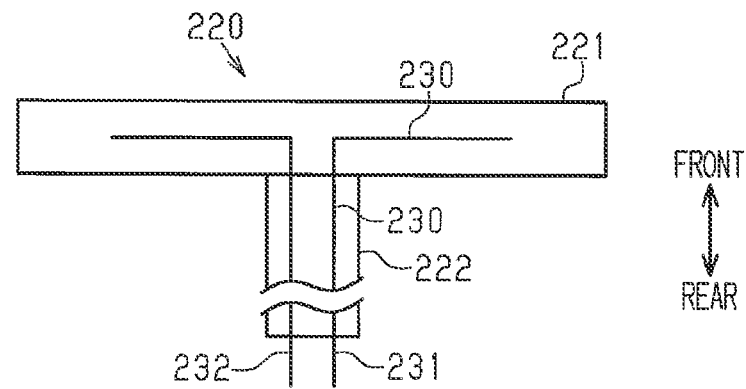
FIG. 18B is a schematic diagram (bottom view) illustrating the wiring of the electric heating wire in the heat generation sheet provided in the radio wave transparent cover according to the third embodiment.

As illustrated in FIGS. 18A, 18B, and 19, the heat generation sheet 220 includes the electric heating wire 230 and two films 220a and 220b. The electric heating wire 230 is interposed between the films 220a and 220b.

The electric heating wire 230 is made of a copper foil. The diameter of the electric heating wire is not particularly limited, and can be appropriately set in a range without being noticeable when viewed from the outside of the vehicle and impairing the design property of the radio wave transparent cover 210. The diameter of the electric heating wire 230 is preferably about 10 to 80 µm, for example.

A wiring pattern of the electric heating wire 230 can also be appropriately set. However, the wiring pattern is preferably set to a wiring pattern in which attenuation of radio waves has difficulty by the electric heating wire 230, and it is possible to exhibit radio wave transparent capability of the radio wave transparent cover 210.

The film thickness of the heat generation sheet 220 is not particularly limited, and can be appropriately set in a range without impairing the design property of the radio wave transparent cover 210 and influencing radio wave transparent capability of the radio wave transparent cover 210. The film thickness of the heat generation sheet 220 is preferably about 0.3 to 0.8 mm, for example. In FIG. 19, for easy understanding, the diameter of the electric heating wire 230 is exaggerated from the actual diameter.

The heat generation sheet 220 is formed as follows. Firstly, as illustrated in FIGS. 18A and 18B, the electric heating wire 230 is formed in a predetermined pattern by etching or printing on the front surface of one film 220a of the two films 220a and 220b. Then, the two films 220a and 220*b* are joined to each other so as to interpose the electric heating wire 230 therebetween. As illustrated in FIG. 17, the heat generation sheet 220 is integrally formed with the radio wave transparent cover 210. At this time, the main body portion 221 of the heat generation sheet 220 is disposed to cover the entire portion of the outer surface covering plate 214 on the side close to the outside of the vehicle (left side in FIG. 17). The extension portion 222 of the heat generation sheet 220 extends to the inside of the vehicle on the side of the radio wave transparent cover 210 that is close to the inside of the vehicle through the lower end edge of the radio wave transparent cover 210.

As illustrated in FIGS. 18B and 19, the tip of the electric heating wire 230 is routed out from the extension portion 222 of the heat generation sheet 220. The tip of the electric heating wire 230 functions as connection terminals 231 and 232 connected to a power source-side terminal of the storage battery B3. Therefore, the connection terminals 231 and 232 at the tip of the extension portion 222 of the heat generation sheet 220 are located inside the vehicle.

Next, a connection structure between the connection terminals 231 and 232 of the electric heating wire 230 of the heat generation sheet 220 and the power source-side terminal of the storage battery B3 will be described.

Figure 20A:
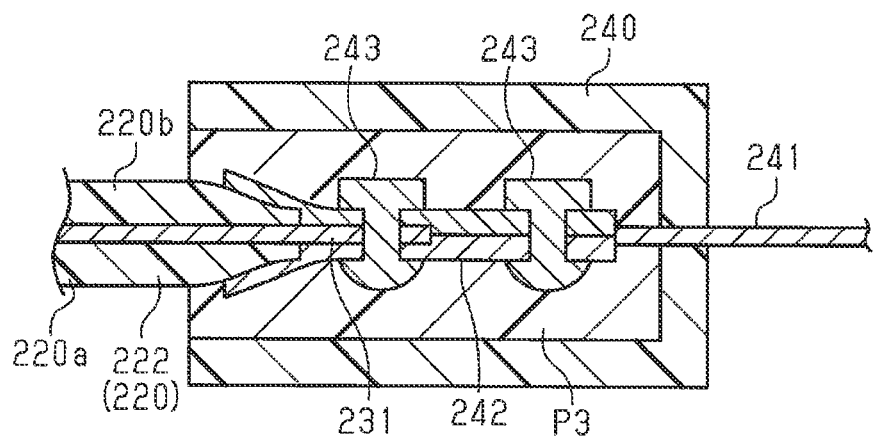
FIG. 20A is a schematic diagram (cross-sectional view) illustrating a connection structure of the heat generation sheet according to the third embodiment.
Figure 20B:
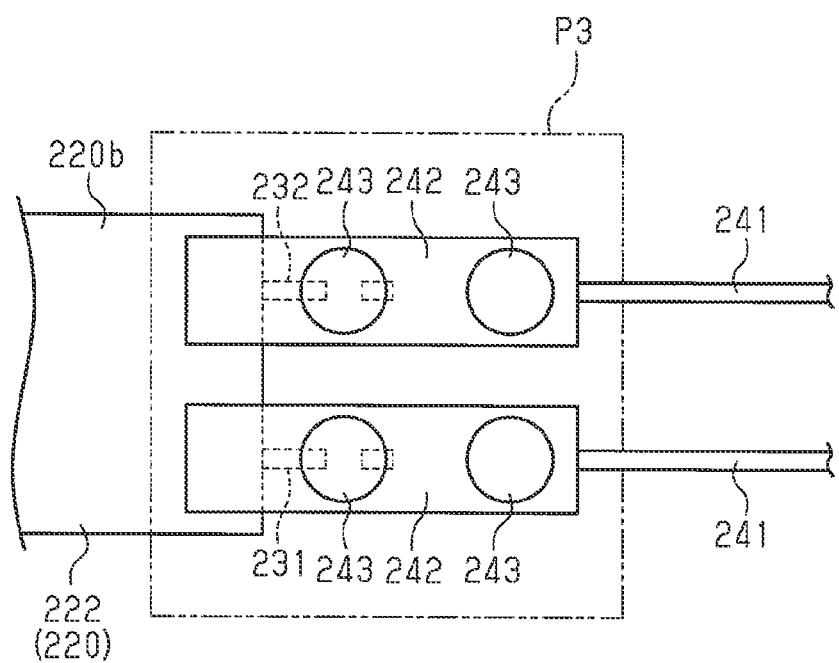
FIG. 20B is a schematic diagram (top view) illustrating the connection structure of the heat generation sheet according to the third embodiment.

As illustrated in FIGS. 20A and 20B, two connector pins 241 and 241 are provided inside the connector 240 provided on the power source side. Crimp terminals 242 and 242 as the power source-side terminals are attached to the tips of the connector pins 241 and 241, respectively. As illustrated in FIG. 19, the connection terminals 231 and 232 routed out from the extension portion 222 of the heat generation sheet 220 are routed out and exposed between the two films 220*a* and 220*b* to the outside.

As illustrated in FIGS. 20A and 20B, a portion from the end portion of the extension portion 222 to the connection terminals 231 and 232 is crimped to the crimp terminals 242 and 242, and thus the connection terminals 231 and 232 are connected to the crimp terminals 242 and 242. The inside of the connector 240 is filled with potting plastic P3. Connection portions between the connection terminals 231 and 232 and the crimp terminals 242 and 242 are included in the potting plastic P3. Thus, the portion from the end portion of the extension portion 222 of the heat generation sheet 220 to the connector pin 241 is fixed by plastic potting.

Such a connection structure of the heat generation sheet 220 is formed as follows. Firstly, the portions from the end portion of the extension portion 222 to the connection terminals 231 and 232 are aligned with the crimp terminals 242 and 242 respectively. Then, the crimp terminals 242 and 242 are fastened at portions for two metal pins 243, which are provided on the crimp terminals 242 and 242, respectively. Thus, the portions from the end portion of the extension portion 222 of the heat generation sheet 220 to the connection terminals 231 and 232 are crimped and joined to the crimp terminals 242 and 242 at the tips of the connector pins 241 and 241.

Then, plastic potting is performed by injecting potting plastic P3 into the connector 240. Plastic potting is performed in the connector 240 such that the portions from the end portion of the extension portion 222 of the heat generation sheet 220 to the crimp terminals 242 and 242 of the connector pins 241 and 241 are covered with plastic. The material of the potting plastic P3 is not particularly limited. As the material for the potting plastic P3, known urethane plastic, silicone plastic, or the like can be used.

Next, the operation of the connection structure of the heat generation sheet 220 in the present embodiment will be described.

As illustrated in FIG. 15, if the switch S3 is turned on, a current from the storage battery B3 is supplied to the connector 240. In the connector 240, the connection terminals 231 and 232 routed out from the extension portion 222 of the heat generation sheet 220 are crimped to the crimp terminals 242 and 242 at the tips of the connector pins 241 and 241, and thus the connection terminals 231 and 232 are connected to the crimp terminals 242 and 242. Thus, a current supplied to the connector pins 241 and 241 of the connector 240 is supplied to the electric heating wire 230 provided in the main body portion 221 of the heat generation sheet 220 through the connection terminals 231 and 232 routed out from the extension portion 222 of the heat generation sheet 220. Accordingly, the electric heating wire 230 is heated to generate heat, and the vehicle outer surface of the radio wave transparent cover 210 becomes warm.

The inside of the connector 240 is filled with the potting plastic P3 This suppresses the occurrence of a situation in which water permeates the surroundings of a portion including a joint portion from the end portion of the extension portion 222 to the end portion of the connector pin 241. Thus, a sealing property of the joint portion is ensured.

The present embodiment has the following advantages.

In the related art, it is known to mount a radio wave radar device on a vehicle such as an automobile. The radio wave radar device detects an obstacle or measures the distance between vehicles by radiating radio waves such as millimeter waves and microwaves and measuring the reflected waves.

If such a radio wave radar device is disposed in an exposed state at the front of the vehicle, the design property of the vehicle may be impaired. Therefore, for example, the radio wave radar device is disposed at a position on the side of the radio wave transparent cover (emblem and the like) (in which one surface forms an outer surface of the vehicle) that is close to the inside of the vehicle, and thus is shielded from the outside of the vehicle by the radio wave transparent cover.

If ice droplets collect on the front surface of the radio wave transparent cover at a low temperature, or water droplets obtained by melting ice droplets or rainwater collect on the front surface thereof, the attenuation amount of radio waves when passing through the radio wave transparent cover increases. Thus, detection accuracy of the radio wave radar device may be degraded. In view of these points, Japanese Laid-Open Patent Publication No. 10-132921 proposes that the electric heating wire is attached to the radio wave transparent cover. The radio wave transparent cover is heated by energizing the electric heating wire, and thus it is possible to melt and remove ice droplets and moisture collected on the radio wave transparent cover. Therefore, it is possible to maintain the front surface of the radio wave transparent cover to be dry, and to suppress an influence of ice droplets and water droplets.

In order to heat the radio wave transparent cover by energizing the radio wave transparent cover, it is necessary to connect the connection terminal on the electric heating wire side routed to the radio wave transparent cover, to the power source-side terminal. The configuration needs to be considered to avoid influence of water droplets, ice droplets, or the like on the connection portion between the connection terminal on the electric heating wire side and the power source-side terminal. However, in the invention described in Japanese Laid-Open Patent Publication No. 10-132921, there is no description about how connection is established between the connection terminal on the electric heating wire side and the power source-side terminal. In addition, no consideration is given to improvement of the sealing property and water resistance at the connection portion between the connection terminal on the electric heating wire side, which is routed to the radio wave transparent cover, and the power source-side terminal.

The connection structure of the heat generation sheet to solve the above problem is a connection structure of the heat generation sheet provided on the radio wave transparent cover disposed in the radio wave path of the radio wave radar device. The heat generation sheet includes two plastic films and an electric heating wire interposed between the plastic films. The heat generation sheet has a main body portion and an extension portion. The main body portion is provided on the front surface of the radio wave transparent cover. The extension portion extends to the back surface of the radio wave transparent cover through an outer edge of the radio wave transparent cover. The connection terminal at the tip of the electric heating wire disposed in the extension portion is connected to the power source-side terminal provided on the back surface of the radio wave transparent cover. The surrounding of the connection portion between the connection terminal and the power source-side terminal is subjected to plastic potting.

According to the above configuration, the heat generation sheet in a state where the electric heating wire is interposed between the two plastic films has the extension portion that extends to the back surface of the radio wave transparent cover through the outer edge of the radio wave transparent cover. Therefore, the connection portion between the connection terminal at the tip of the electric heating wire and the power source-side terminal is provided on the back surface of the radio wave transparent cover. Thus, the connection portion is unlikely to receive an influence of water droplets, ice droplets, or the like from the outside of the vehicle. The connection terminal at the tip of the electric heating wire in the extension portion of the heat generation sheet is connected to the power source-side terminal provided on the back surface of the radio wave transparent cover, and the surrounding of the connection portion is subjected to plastic potting. Therefore, the sealing property of the connection portion between the connection terminal at the tip of the electric heating wire and the power source-side terminal is improved. This suppresses the occurrence of a situation in which moisture caused by water droplets, ice droplets, and the like permeates the connection portion. It is possible to improve water resistance of the connection portion between the heat generation sheet and the power source-side terminal.

In the above configuration, preferably, the connection terminal is the electric heating wire routed out from the extension portion, the power source-side terminal is the crimp terminal at the tip of the connector pin provided in the connector, the extension portion and the connection terminal routed out from the extension portion are crimped to the crimp terminal, and the inside of the connector is subjected to plastic potting.

In the above configuration, preferably, the connection terminal is the electric heating wire routed out from the extension portion, the power source-side terminal is the end portion of the harness provided in the connector, the connection terminal is joined to the end portion of the harness and the substrate, and the surrounding of the portion from the extension portion to the harness is subjected to plastic potting.

In the above configuration, preferably, the power source-side terminal is the end portion of the harness provided in the connector, the connection terminal is crimped at the end portion of the harness and an eyelet terminal, and the surrounding of the portion from the extension portion to the harness is subjected to plastic potting.

These preferable configurations will be described below.

The advantages of the present embodiment will now be described in more detail.

(1) The heat generation sheet 220 provided in the radio wave transparent cover 210 in the present embodiment is configured by interposing the electric heating wire 230 between two PC plastics 220*a* and 220*b*. The heat generation sheet 220 includes the main body portion 221 provided on the front surface of the radio wave transparent cover 210 and the extension portion 222 extending to the inside of the vehicle through the lower end edge of the radio wave transparent cover 210. The tip of the electric heating wire 230 routed out from the extension portion 222 is connected to the crimp terminals 242 and 242 at the tip of the connector pins 241 and 241 in the connector 240 provided on the vehicle inner side of the radio wave transparent cover 210, as the connection terminals 231 and 232 of the electric heating wire 230. The surrounding of the connection portion between the connection terminals 231 and 232 and the crimp terminals 242 and 242 is subjected to plastic potting.

Therefore, the connection portion between the connection terminals 231 and 232 and the crimp terminals 242 and 242 is provided on the vehicle inner side of the radio wave transparent cover 210. Thus, the connection portion is unlikely to receive an influence of water droplets, ice droplets, or the like from the outside of the vehicle. In addition, the sealing property of the connection portion is improved by plastic potting. This suppresses the occurrence of a situation in which moisture caused by water droplets, ice droplets, and the like permeates the connection portion. It is possible to improve water resistance of the connection structure of the heat generation sheet 220 provided in the radio wave transparent cover 210.

(2) In the connection structure of the heat generation sheet 220 provided in the radio wave transparent cover 210 in the present embodiment, the portions from the end portion of the extension portion 222 of the heat generation sheet 220 to the connection terminals 231 and 232 are crimped by the crimp terminals 242 and 242. This suppresses, the occurrence of a situation in which the connection terminals 231 and 232 are exposed to the outside air, thereby suppressing the influence of moisture.

The above embodiment may be modified as follows, and the modifications may be applied in appropriate combination.

In the above embodiment, the connection terminals 231 and 232 of the heat generation sheet 220 are fixed by being crimped to the crimp terminals 242 and 242 at the tips of the connector pins 241 and 241 provided in the connector 240. However, the connection structure is not limited to the above description.

Figure 21:
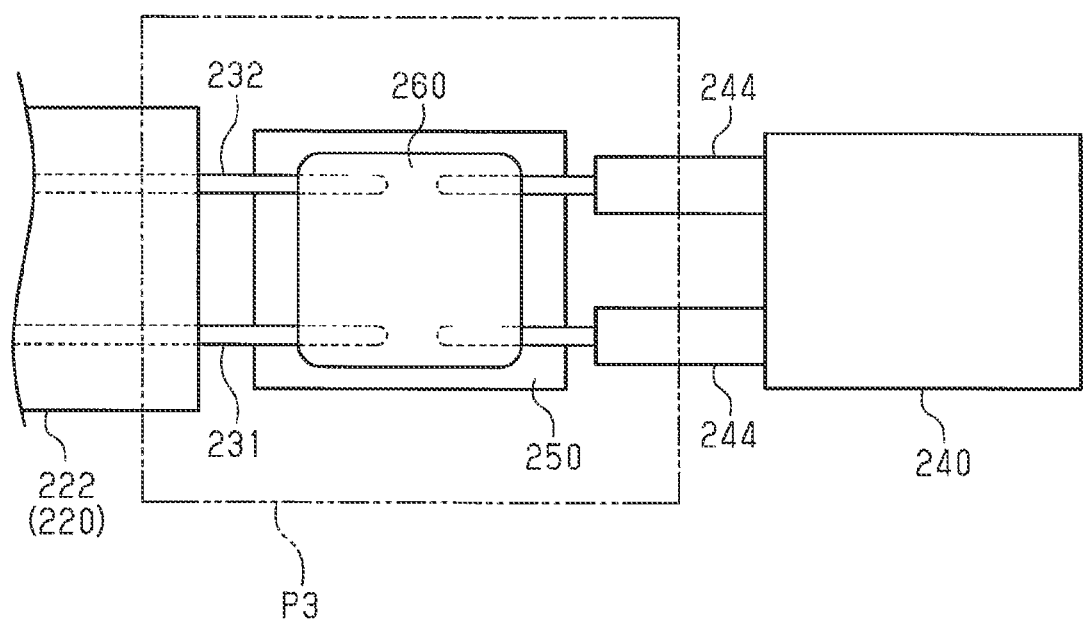
FIG. 21 is a schematic diagram illustrating a modification of the connection structure of the heat generation sheet according to the third embodiment.

For example, as illustrated in FIG. 21, the connection terminals 231 and 232 routed out from the end portion of the extension portion 222 and harnesses 244 and 244 routed out from the connector 240 are soldered on a substrate 250. The connection terminals 231 and 232 are electrically connected to the harnesses 244 and 244 through a solder layer 260. The surrounding of the portions from the end portion of the extension portion 222 to the harnesses 244 and 244 is fixed by plastic potting. Even in such a connection structure, with plastic potting, the sealing property of the connection portion between the connection terminals 231 and 232 and the harnesses 244 and 244 is improved. This suppresses the occurrence of a situation in which moisture caused by water droplets, ice droplets, and the like permeates the connection portion. In FIG. 21, the position for plastic potting is indicated by a long dashed double-short dashed line, so as to facilitate the understanding of the connection structure. However, in practice, the surrounding of the portions from the end portion of the extension portion 222 to the harnesses 244 and 244 is covered by plastic potting.

In the above embodiment, the tip of the electric heating wire 230 routed out from the end portion of the extension portion 222 is joined to the crimp terminals 242 and 242 being the power source-side terminals as the connection terminals 231 and 232. However, the electric heating wire 230 may be joined to the crimp terminals 242 and 242 without routing out the electric heating wire 230 from the end portion of the extension portion 222. In this case, the tip of the electric heating wire 230 functioning as the connection terminals 231 and 232 is provided at the end portion of the extension portions 222.

Figure 22:
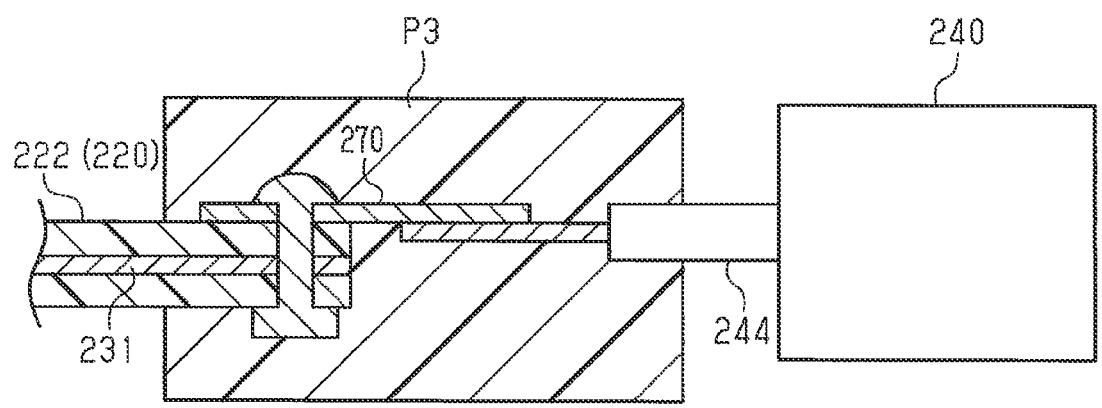
FIG. 22 is a schematic diagram illustrating another modification of the heat generation sheet connecting structure according to the third embodiment.

For example, as illustrated in FIG. 22, one end portion of an eyelet terminal 270 is crimped to the end portion of the extension portion 222, and the other end portion of the eyelet terminal 270 is joined to the end portions of the harnesses 244 and 244 routed out from the connector 240. Thus, the connection terminals 231 and 232 are electrically connected to the harnesses 244 and 244 through the eyelet terminal 270. The surrounding of the portions from the end portion of the extension portion 222 to the harnesses 244 and 244 is fixed by plastic potting. Even in such a connection structure, with plastic potting, the sealing property of the connection portion between the connection terminals 231 and 232 and the harnesses 244 and 244 is improved. This suppresses the occurrence of a situation in which moisture caused by water droplets, ice droplets, and the like permeates the connection portion. Compared to the connect structure in FIG. 21, it is possible to simplify the structure because the substrate 250 is not required.

In the above embodiment, the electric heating wire 230 and the connection terminals 231 and 232 are made of copper foils, but the material is not limited to the above description.

The materials of the inner surface covering plate 211, the coating layer 212, the metal film layer 213, and the outer surface covering plate 214 forming the radio wave transparent cover 210, and the material of the heat generation sheet 220 are also limited to those in the above embodiment. The materials of the radio wave transparent cover 210 and the heat generation sheet 220 may have radio wave transparency.

Fourth Embodiment

A radio wave transparent cover according to a fourth embodiment regarding will now be described with reference to FIGS. 23 to 27B.

Firstly, an overall configuration of a vehicle to which a radio wave transparent cover in the present embodiment is applied will be described.

Figure 23:
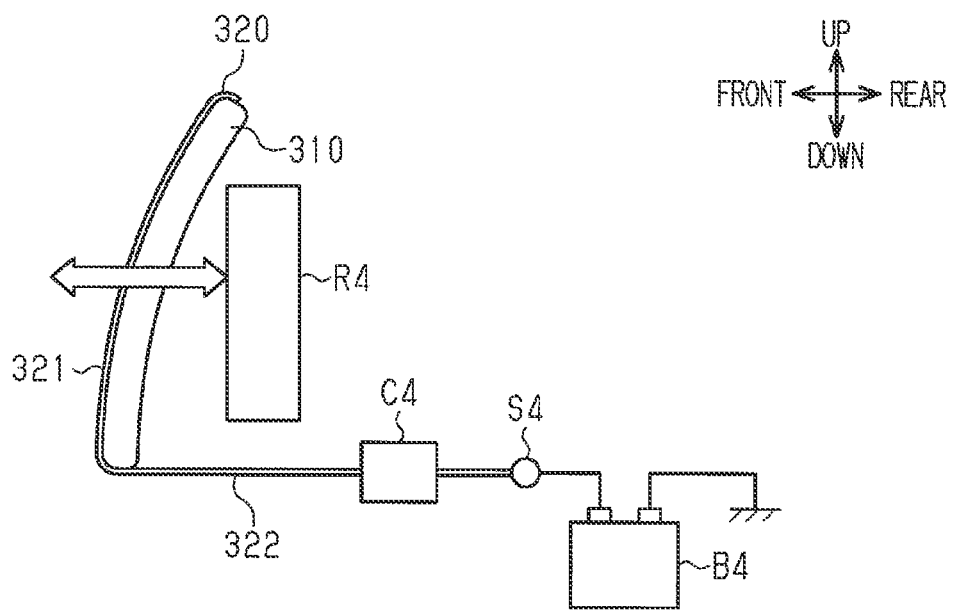
FIG. 23 is a schematic diagram illustrating a schematic configuration of a vehicle to which a radio wave transparent cover is applied, according to a fourth embodiment.

As illustrated in FIG. 23, a radio wave radar device R4 is mounted in the front of a vehicle. As indicated by an arrow in FIG. 23, the radio wave radar device R4 detects the surrounding conditions of the vehicle by radiating radio waves (millimeter waves) toward the front (left side of FIG. 23) of the vehicle and measuring the reflected waves.

Figure 24:
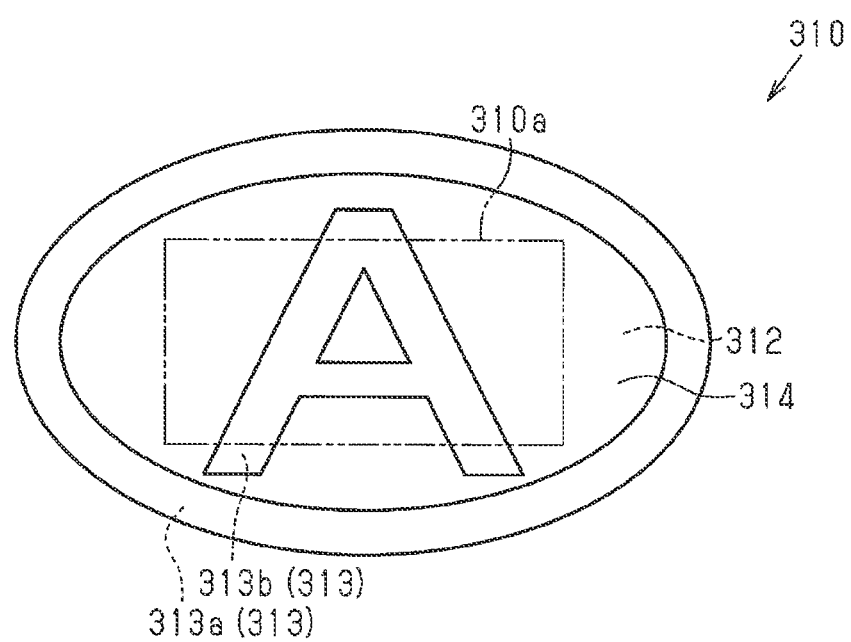
FIG. 24 is a front view illustrating a radio wave transparent cover according to the fourth embodiment.

As illustrated in FIGS. 23 and 24, a radio wave transparent cover 310 is attached to the front of the vehicle. The radio wave transparent cover 310 is an exterior component (so-called emblem) in which a portion far from the radio wave radar device R4, that is, a portion on the side (left side in FIG. 23 and front side of the paper surface in FIG. 24) near to the outside of the vehicle is set as an outer wall portion and a design portion of the vehicle. The radio wave transparent cover 310 has a substantially elliptical plate shape. The radio wave transparent cover 310 is disposed in front of the radio wave radar device R4 to block a radio wave path (arrow in FIG. 23) of the radio wave radar device R4. Specifically, the radio wave transparent cover 310 is disposed on the side of the radio wave radar device R4 that is close to the outside of the vehicle, such that all radio waves radiated from the radio wave radar device R4 and the reflected waves measured by the radio wave radar device R4 pass through the center portion (radio wave transparent region 310a indicated by a long dashed double-short dashed line in FIG. 24) of the radio wave transparent cover 310. With the radio wave transparent cover 310, the radio wave radar device R4 is hidden from the outside of the vehicle.

Next, the structure of the radio wave transparent cover 310 will be described.

Figure 25:
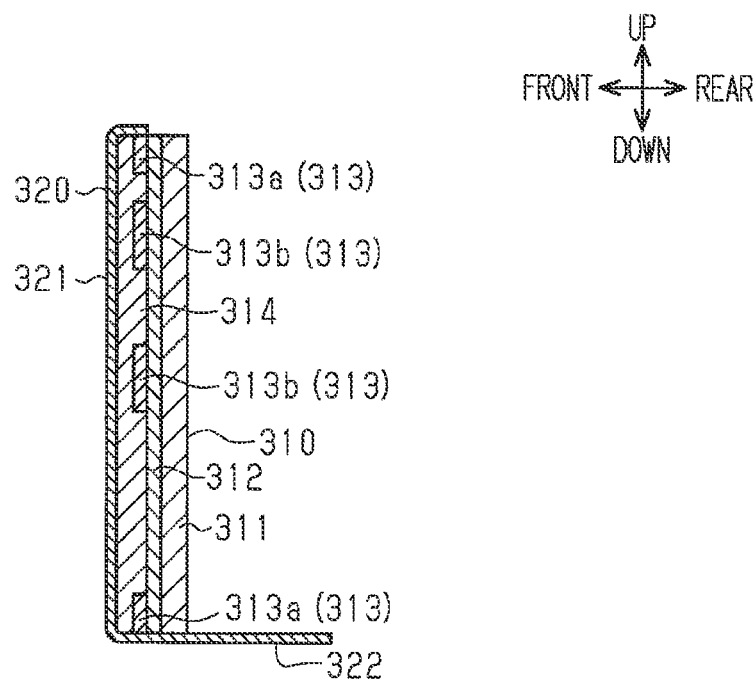
FIG. 25 is a cross-sectional side view illustrating the radio wave transparent cover according to the fourth embodiment.

As illustrated in FIG. 25, the radio wave transparent cover 310 has a multilayer structure in which an inner covering plate 311, a coating layer 312, a metal film layer 313, an outer covering plate 314, and a thermal conductive sheet 320 are arranged in order from the side (right side in FIG. 25) closer to the inside of the vehicle. In FIG. 25, for easy understanding, the thickness of the coating layer 312 and the thickness of the metal film layer 313 are exaggerated from the actual thickness.

The inner covering plate 311 is formed of acrylonitrile-ethylene-styrene plastic (AES plastic). The coating layer 312 is formed of a black acrylic coating material. The metal film layer 313 is an island-like film made of indium. As illustrated in FIGS. 24 and 25, the metal film layer 313 has an outer circumferential portion 313a and a character portion (character A) 313b. The outer covering plate 314 is made of a transparent polycarbonate plastic (PC plastic). The thermal conductive sheet 320 is formed by stacking two transparent polycarbonate plastic (PC plastic). An electric heating wire 330 and metal wires 340 described later are mounted in the thermal conductive sheet 320.

All the AES plastic (inner covering plate 311), the acrylic coating material (coating layer 312), and the PC plastic (outer covering plate 314 and thermal conductive sheet 320) are materials having radio wave transparency for allowing radio waves to pass through. The island-like film (metal film layer 313) made of indium has radio wave transparency for allowing radio waves to pass through. Thus, all of the inner covering plate 311, the coating layer 312, the metal film layer 313, and the outer covering plate 314 of the radio wave transparent cover 310 have radio wave transparency for allowing radio waves to pass through. Portions of the thermal conductive sheet 320 other than the electric heating wire 330 and the metal wires 340 have radio wave transparency for allowing radio waves to pass through.

The radio wave transparent cover 310 has a structure in which the transparent thermal conductive sheet 320, the transparent outer covering plate 314, the metal-colored metal film layer 313, and the black coating layer 312 are stacked in order from the side closer to the outside of the vehicle. Therefore, as illustrated in FIG. 24, in a case where the radio wave transparent cover 310 is viewed from the outside of the vehicle, a pattern (outer frame and character A in the present embodiment) of a metallic color (metal film layer 313) on a black background (coating layer 312) can be visually recognized.

Next, the structure of the thermal conductive sheet 320 will be described.

As illustrated in FIGS. 23 and 25, the thermal conductive sheet 320 includes a main body portion 321 and an extension portion 322. The main body portion 321 is disposed to cover the entire outer surface of the outer covering plate 314. The extension portion 322 extends from the main body portion 321 and extends to the inside of the vehicle through the lower edges of the inner covering plate 311, the coating layer 312, the metal film layer 313, and the outer covering plate 314.

Figure 26:
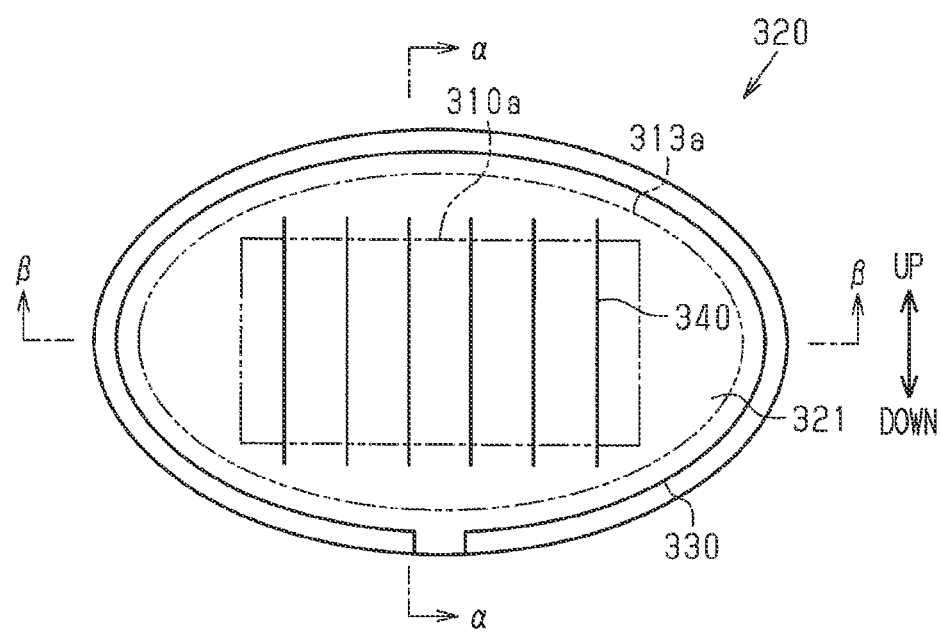
FIG. 26 is a schematic front view illustrating a thermal conductive sheet provided on the radio wave transparent cover according to the fourth embodiment.
Figure 27A:
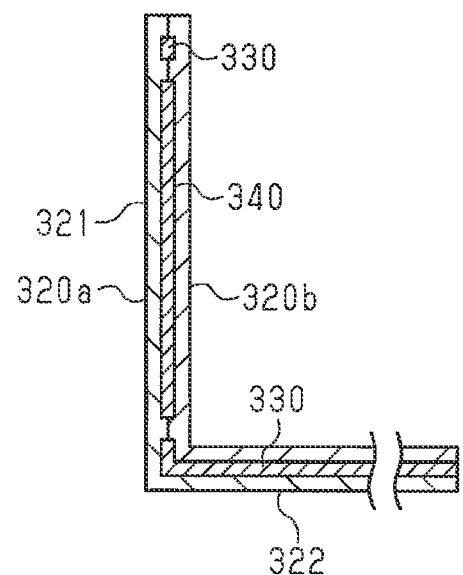
FIG. 27A is a cross-sectional view illustrating the thermal conductive sheet according to the fourth embodiment, and is a cross-sectional view taken along line α-α in FIG. 26.
Figure 27B:
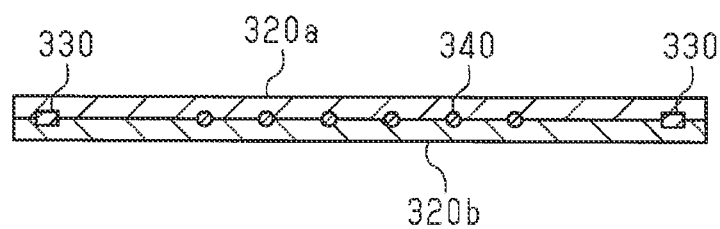
FIG. 27B is a cross-sectional view illustrating the thermal conductive sheet according to the fourth embodiment, and is a cross-sectional view taken along line β-β in FIG. 26.

As illustrated in FIGS. 26, 27A and 27B, the thermal conductive sheet 320 is configured by interposing the electric heating wire 330 and the metal wires 340 between two films 320a and 320b made of a polycarbonate plastic (PC plastic). The total film thickness of the thermal conductive sheet 320 is not particularly limited, but can be appropriately set in a range in which it is possible to visually recognize the outer circumferential portion 313a and the character portion 313b of the metal film layer 313 without influencing the radio wave transparency. The total film thickness of the thermal conductive sheet 320 is preferably about 0.3 to 0.8 mm, for example.

As illustrated in FIGS. 26 and 27A, the electric heating wire 330 is annularly provided at the outer circumferential portion of the main body portion 321 of the thermal conductive sheet 320. The electric heating wire 330 extends from the lower end portion of the main body portion 321 of the thermal conductive sheet 320 over the extension portion 322. A portion of the main body portion 321, at which the electric heating wire 330 is provided is a portion corresponding to the outer circumferential portion 313a of the metal film layer 313. In FIG. 26, the portion of the main body portion 321, which corresponds to the outer circumferential portion 313a of the metal film layer 313 is indicated by a long dashed double-short dashed line.

In the present embodiment, the electric heating wire 330 is made of a copper foil. The diameter of the electric heating wire is not particularly limited, and can be appropriately set in a range without being noticeable when viewed from the outside of the vehicle or impairing the design property of the radio wave transparent cover 310. The diameter of the electric heating wire 330 is preferably about 10 to 80 µm, for example.

As illustrated in FIG. 23, the extension portion 322 of the thermal conductive sheet 320 is connected to a connector C4 at the tip of the extension portion 322. The connector C4 is connected to a storage battery B4 through a switch S4. The end portion of the electric heating wire 330 provided in the extension portion 322 functions as a connection terminal connected to the storage battery B4.

As illustrated in FIGS. 26, 27A, and 27B, a plurality of metal wires 340 are arranged side by side at the center portion of the main body portion 321 of the thermal conductive sheet 320, so as to extend in the up-down direction. A portion of the main body portion 321, at which the metal wires 340 are provided is a portion corresponding to the radio wave transparent region 310a in the radio wave transparent cover 310. The metal wires 340 are provided over the entirety of the radio wave transparent region 310a.

As illustrated in FIG. 26, the upper and lower end portions of the metal wires 340 extend to the vicinity of the electric heating wire 330 provided at the outer circumferential portion of the main body portion 321. However, the upper and lower end portions of the metal wires 340 are provided at positions spaced from the electric heating wire 330 and are not in contact with the electric heating wire 330. In the present embodiment, the metal wires 340 is made of a copper wire. The diameter of the electric heating wire is not particularly limited, and can be appropriately set in a range without being noticeable when viewed from the outside of the vehicle and impairing the design property of the radio wave transparent cover 310. The diameters of the metal wires 340 are preferably about 10 to 20 µm, for example.

Next, the operation of the radio wave transparent cover in the present embodiment will be described.

As illustrated in FIG. 23, if the switch S4 is turned on, a current from the storage battery B4 is supplied to the electric heating wire 330 provided in the main body portion 321 through the connector C4 and the connection terminal of the electric heating wire 330, which is provided in the extension portion 322 of the thermal conductive sheet 320. Thus, the electric heating wire 330 is heated, and the outer circumferential portion of the thermal conductive sheet 320 generates heat.

The metal wires 340 arranged side by side at the center portion of the main body portion 321 of the thermal conductive sheet 320 are not connected to the electric heating wire 330. Therefore, no current is supplied to the metal wires 340. However, the upper and lower end portions of the metal wires 340 extend to the vicinity of the electric heating wire 330. Therefore, the radiant heat from the electric heating wire 330 is transferred to the metal wires 340, and the metal wires 340 are also heated to generate heat. The portion at which the metal wires 340 are arranged side by side extends over the entirety of the radio wave transparent region 310a of the radio wave transparent cover 310. Thus, the entirety of the radio wave transparent region 310a is heated and generates heat. Therefore, even though snow collects on the radio wave transparent region 310a, the snow melts. As described above, the metal wires 340 in the present embodiment is provided in the radio wave transparent region 310a, and functions as a thermal conductive portion at which the heat from the electric heating wire 330 is transferred in a state of not being electrically connected to the electric heating wire 330 as a heat source.

The electric heating wire 330 heated by the current being supplied is formed of a copper foil having a diameter larger than the diameter of the metal wires 340. However, the portion at which the electric heating wire 330 is provided is a portion of the main body portion 321 of the thermal conductive sheet 320, which corresponds to the outer circumferential portion 313a of the metal film layer 313. Therefore, the electric heating wire 330 is easily hidden by the metal color of the metal film layer 313 and thus is not noticeable when viewed from the outside of the vehicle.

The metal wires 340 arranged side by side at the center portion of the main body portion 321 are formed of a copper wire having a relatively small diameter. Since the metal wires 340 extend linearly and does not have a folded portion, complicated metal reflection is suppressed. Therefore, it is not noticeable when viewed from the outside of the vehicle.

The present embodiment has the following advantages.

In the related art, it is known to mount a radio wave radar device on a vehicle such as an automobile. The radio wave radar device detects an obstacle or measures the distance between vehicles by radiating radio waves such as millimeter waves and microwaves and measuring the reflected waves.

If such a radio wave radar device is disposed in an exposed state at the front of the vehicle, the design property of the vehicle may be impaired. Therefore, for example, the radio wave radar device is disposed at a position on the side of the radio wave transparent cover (emblem and the like) (in which one surface forms an outer surface of the vehicle) that is close to the inside of the vehicle, and thus is shielded from the outside of the vehicle by the radio wave transparent cover.

If snow collects on the front surface of the radio wave transparent cover when the outside air temperature is low, the attenuation amount of the radio wave when passing through the radio wave transparent cover increases. Thus, detection accuracy of the radio wave radar device may be degraded. In view of the points, it is proposed that the electric heating wire is attached to the radio wave transparent cover (for example, Japanese Laid-Open Patent Publication No. 10-132921). The radio wave transparent cover is heated by energizing the electric heating wire, and thus it is possible to melt snow collected on the radio wave transparent cover. Therefore, it is possible to suppress an influence of snow on radio wave performance.

In the radio wave transparent cover to which the electric heating wire is attached, the attenuation amount of the radio wave increases by the current flowing in the electric heating wire, and this may affect the radio wave performance. In Japanese Laid-Open Patent Publication No. 10-132921, in order to suppress such an increase in the attenuation amount of the radio wave, the electric heating wire in the portion (radio wave transparent region) through which radio waves pass in the radio wave transparent cover is arranged in a meandering manner to be orthogonal to a polarization plane of the radio wave mainly using the extension direction.

However, the electric heating wire is arranged in a meandering manner. Thus, the extension direction of the electric heating wire is shifted from the direction orthogonal to the polarization plane of the radio wave, at a portion at which the extension direction of the electric heating wire changes. Therefore, it is not possible to suppress the attenuation of radio waves at such a portion at which the extension direction of the electric heating wire changes. Thus, there is still a problem to solve regarding elimination of the influence of the electric heating wire on radio wave transparent.

The radio wave transparent cover to solve the above problem has a radio wave transparent region that is disposed in the radio wave path of the radio wave radar device, and through which the radio wave passes. A heat source is provided outside the radio wave transparent region. A thermal conductive portion is provided in the radio wave transparent region. Heat from the heat source is transferred at the thermal conductive portion in a state of being not electrically connected to the heat source.

According to the above configuration, the thermal conductive portion provided in the radio wave transparent region is not electrically connected to the heat source. Therefore, current flowing by energization from the heat source does not occur in the thermal conductive portion. In the radio wave transparent region in which such a thermal conductive portion is provided, attenuation of the passing radio wave is appropriately suppressed. The radio wave transparent cover capable of suppressing the influence of the radio wave radar device on radio wave transparent is obtained.

In the above configuration, the thermal conductive portion is preferably configured by the plurality of metal wires.

In the above configuration, the thermal conductive portion is preferably configured by a conductive coating film or a thermal conductive coating film.

In the above configuration, the thermal conductive portion is preferably a transparent film having high resistance.

In the above configuration, the heat source is preferably an electric heating wire routed to surround the circumference of the radio wave transparent region.

The advantages of the present embodiment will now be described in more detail.

(1) In the radio wave transparent cover 310 in the present embodiment, the thermal conductive sheet 320 is stacked on the outer surface. The electric heating wire 330 connected to the storage battery B4 is provided in the outer circumferential portion of the thermal conductive sheet 320. The thermal conductive portion formed from the metal wires 340 is provided at a portion which is the center portion of the thermal conductive sheet 320 and corresponds to the radio wave transparent region 310*a* of the radio wave transparent cover 310 in the thermal conductive sheet 320. The metal wires 340 extend to the vicinity of the electric heating wire 330.

Therefore, the metal wires 340 generate heat by transferring radiant heat from the electric heating wire 330. Thus, the radio wave transparent region 310*a* of the radio wave transparent cover 310 is heated. Even in a case where snow collects on the portion being the radio wave transparent region 310*a*, it is possible to melt the snow. As a result, it is possible to suppress the attenuation of radio waves passing through the radio wave transparent region 310*a* of the radio wave transparent cover 310.

(2) The metal wires 340 are not electrically connected to the electric heating wire 330, and no current flows in the metal wires 340. Therefore, in the radio wave transparent region 310*a* of the radio wave transparent cover 310, in which the metal wires 340 are provided, it is possible to suppress the attenuation of radio waves due to the current. The wiring pattern of the metal wires 340 is not required to be a wiring pattern causing the attenuation of radio waves to be suppressed. Therefore, it is possible to suppress restriction in the wiring pattern of the metal wires 340.

(3) The electric heating wire 330 as the heat source is routed to surround the circumference of the radio wave transparent region 310*a*. Therefore, it is possible to suppress the influence of the current flowing in the electric heating wire 330 on the radio wave transparent.

(4) The thermal conductive portion is configured by the plurality of metal wires 340 being arranged side by side. The upper and lower end portions of each metal wire 340 extend to the vicinity of the electric heating wire 330. Therefore, radiant heat from the electric heating wire 330 is easily transferred to each of the plurality of metal wires 340, and thus it is possible to cause the plurality of metal wires 340 to generate heat with high efficiency.

(5) The metal wires 340 in the present embodiment are made of a copper wire. Therefore, it is possible to improve thermal conductivity and improve heat generation efficiency in the thermal conductive portion.

(6) The plurality of metal wires 340 extending in the up-down direction are arranged side by side in a lateral direction without being folded back halfway. This suppresses complicated metal reflection in a case where folded portions are in the plurality of metal wires 340. Thus, even though the metal wires 340 are disposed at the center portion of the main body portion 321 of the thermal conductive sheet 320, the metal wires 340 are hardly noticeable. It is possible to suppress degradation of the appearance of the radio wave transparent cover 310 and to improve the design property.

(7) The electric heating wire 330 is provided annularly at the portion corresponding to the outer circumferential portion 313a of the metal film layer 313 in the thermal conductive sheet 320. Therefore, it is difficult to distinguish the electric heating wire 330 from the metal color of the metal film layer 313. This suppresses degradation of the appearance of the radio wave transparent cover 310.

The above embodiment may be modified as follows, and the modifications may be applied in appropriate combination.

In the above embodiment, although the thermal conductive portion is configured by the plurality of metal wires 340, the embodiment is not limited thereto. For example, a heat conductive coating material, a heat conductive ink, or the like having high thermal conductivity may be stacked in a form of a coating film. A conductive coating material, a conductive ink, or the like having high thermal conductivity may be stacked in a form of a coating film. A transparent and high-resistance metal linearization film (for example, $Al_2O_3$ film) or a diamond thin film may be stacked. The various coating films and thin films can be provided over the entire region corresponding to the radio wave transparent region 310a. Even in a case where the coating films or thin films are stacked, snow on the surface of the film is melted by heat conduction from the electric heating wire 330. Thus, it is possible to suppress attenuation of radio waves due to the current. Accordingly, a coating film of a conductive coating material, a conductive ink, a thermal conductive coating material, and a thermal conductive ink, or the like, a metal oxide film, or a diamond thin film functions as the thermal conductive portion.

The wiring pattern of the metal wires 340 as the thermal conductive portion does not necessarily need to be a straight line extending in the up-down direction. The wiring pattern can be set freely. For example, the plurality of metal wires 340 may be straight lines extending in the left-right direction. One metal wire 340 may be bent in a meandering shape. A mesh shape in which the plurality of metal wires 340 overlap each other and extend may be used.

In the above embodiment, the metal wires 340 are provided at a position at which the metal wires 340 is not brought into contact with the electric heating wire 330, but may be provided at a position at which the metal wires 340 come into contact with the electric heating wire 330. In this case, the contact portions of the metal wires 340 with the electric heating wire 330 are preferably insulated such that the current does not flow in the metal wires 340.

In the above embodiment, the electric heating wire 330 is provided at the outer circumferential portion of the thermal conductive sheet 320 as the heat source, but the type of the heat source is not limited to the above description. For example, a transparent conductive film of indium tin oxide (ITO) may be provided at the outer circumferential portion of the thermal conductive sheet 320 and may be energized.

In the above embodiment, the electric heating wire 330 as the heat source is provided on the outer circumferential portion of the thermal conductive sheet 320, but the heat source does not necessarily to be integrated with the thermal conductive sheet 320. The heat source does not necessarily need to be integrated with the radio wave transparent cover 310. For example, the heat source may be provided in the vicinity of the back surface of the radio wave transparent cover 310. Even in such a case, the radiant heat from the heat source is transferred to the thermal conductive portion of the thermal conductive sheet 320, and thus it is possible to heat the radio wave transparent region 310a.

In the above embodiment, the electric heating wire 330 is made of a copper foil, but the material is not limited to the above description. The metal wires 340 are made of copper wires, but the material is not limited to the above description.

The materials of the inner covering plate 311, the coating layer 312, the metal film layer 313, and the outer covering plate 314 forming the radio wave transparent cover 310, and the material of the thermal conductive sheet 320 are also limited to those in the above embodiment. The materials of the radio wave transparent cover 310 and the thermal conductive sheet 320 may have radio wave transparency.

Technical ideas that can be obtained from the above embodiments will be described.

The thermal conductive portion is provided over the entirety of the radio wave transparent region.

The heat source is provided over the metal film layer of the radio wave transparent cover.

The heat source is provided on the back surface of the radio wave transparent cover.

Fifth Embodiment

A vehicle decorative component according to a fifth embodiment will now be described with reference to FIGS. 28 to 31. The vehicle decorative component is an emblem. In the drawings, the scale of each member is appropriately changed and illustrated in order to make each member a recognizable size.

Figure 29:
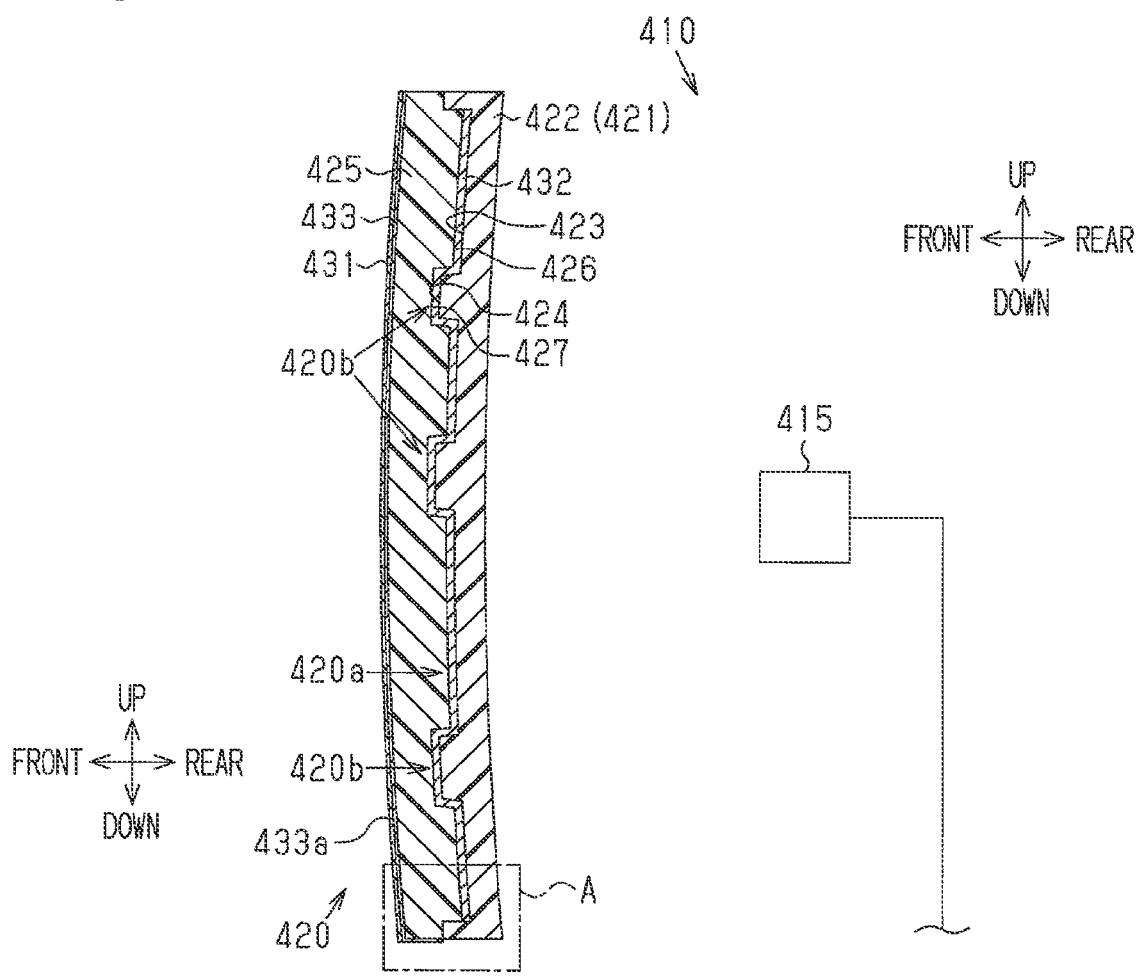
FIG. 29 is an explanatory diagram illustrating a cross-sectional structure of an emblem according to the fifth embodiment, which is taken along line XXIX-XXIX in FIG. 28, along with a millimeter-wave radar device.
Figure 30:
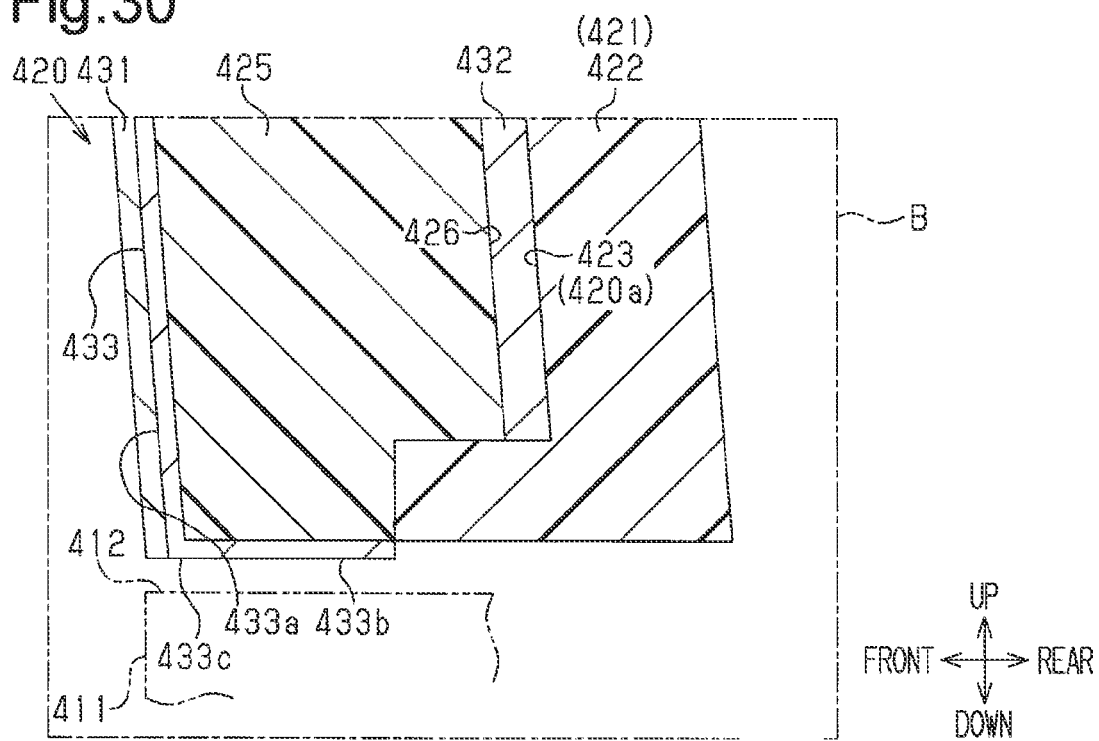
FIG. 30 is an enlarged view illustrating a range A in FIG. 29.

As illustrated in FIGS. 29 and 30, a front grille 411 is attached to the front portion of an engine compartment of a vehicle 410. The front grille 411 cools a radiator by introducing the outside air such as relative wind into the engine compartment.

A millimeter-wave radar device 415 is installed behind the front grille 411 and in front of the radiator. The millimeter-wave radar device 415 functions as a sensor in adaptive cruise control (ACC). The millimeter-wave radar device 415 transmits a millimeter wave and receives the millimeter wave reflected by an object. Thus, the inter-vehicle distance and a relative speed between the preceding vehicle and the host vehicle (vehicle 410) are measured from the difference between the transmitted wave and the received wave. A millimeter wave refers to a radio wave having a wavelength of 1 to 10 mm and a frequency of 30 to 300 GHz. In the ACC, the throttle and brake of the engine are controlled based on the measurement result by the millimeter-wave radar device 415 to accelerate or decelerate the host vehicle (vehicle 410) and to control the inter-vehicle distance.

The thickness of the front grille 411 is not constant and is similar to a general front grille. In the front grille 411, similar to the general front grille, a metal plating layer may be formed on the front surface of the plastic base member. Thus, the front grille 411 causes interference with the transmitted or reflected millimeter wave. Therefore, in the front grille 411, a window portion 412 is provided at a place as a millimeter wave path of the millimeter-wave radar device 415, specifically, at a place which is forward in a transmission direction of a millimeter wave from the millimeter-wave radar device. The window portion 412 is a portion of front grille 411, into which an emblem 420 described later is fitted.

Figure 28:
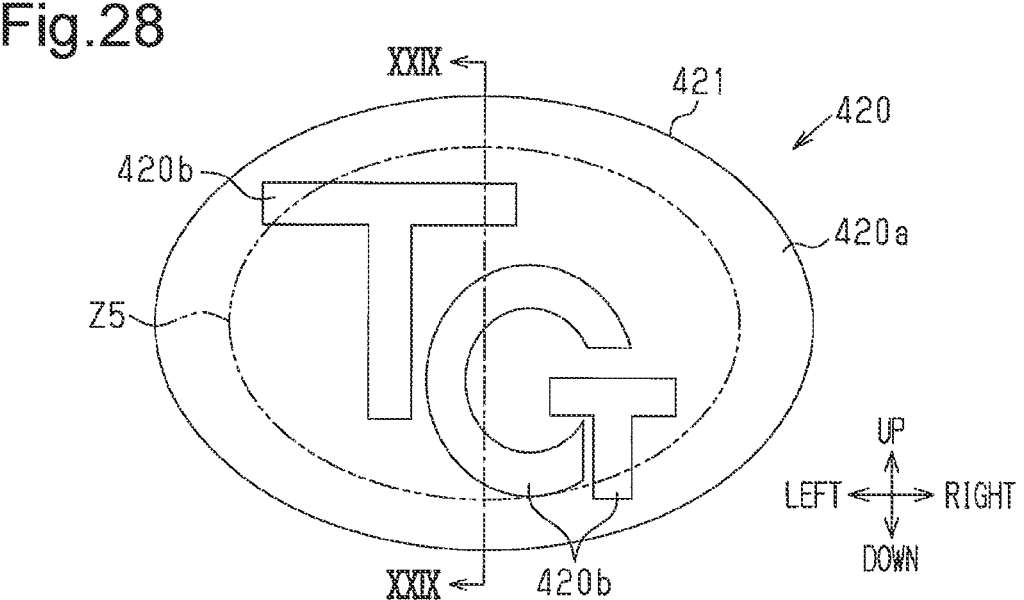
FIG. 28 is a front view illustrating an emblem in a fifth embodiment.

As illustrated in FIGS. 28 and 29, the emblem 420 includes a decorative main body portion 421 and a heating sheet 433.

The decorative main body portion 421 is attached to the front of the vehicle 410 in the transmission direction of a millimeter wave from the millimeter-wave radar device 415 to decorate the vehicle 410. The decorative main body portion 421 has millimeter wave transparency. The decorative main body portion 421 includes a base member 422, a transparent member 425, and a decorating layer 432. The decorative main body portion 421 has an elliptical plate shape as a whole. The decorative main body portion 421 is gently bent to swell forward.

The base member 422 is formed of a plastic material such as acrylonitrile-ethylene-styrene copolymer (AES) plastic, which is a plastic material having a small dielectric loss tangent (index value indicating the degree of electrical energy loss in the dielectric matter). The base member 422 is formed to be colored. The dielectric loss tangent of the AES plastic is 0.007. If the dielectric loss tangent is small, it is difficult to convert the millimeter wave into thermal energy. Thus, it is possible to suppress the attenuation of the millimeter wave.

A general portion 423 and a protrusion portion 424 are formed in the front portion of the base member 422. The general portion 423 extends to be substantially orthogonal to a front-rear direction. The protrusion portion 424 protrudes forward from the general portion 423. The general portion 423 corresponds to a background region 420a of the emblem 420 in FIG. 28, and the protrusion portion 424 corresponds to a character region 420b of the emblem 420. The base member 422 may be formed of plastic having a dielectric constant close to that of the transparent member 425 instead of the AES plastic. Examples of such plastic include acrylonitrile-styrene-acrylate copolymer (ASA) plastic, polycarbonate (PC) plastic, and acrylonitrile-butadiene-styrene copolymer (PC/ABS) plastic.

The transparent member 425 is disposed in front of the base member 422. The transparent member 425 is transparently formed of a plastic material such as PC plastic being a plastic material having a small dielectric loss tangent. The dielectric loss tangent of the PC plastic is 0.006. The dielectric constant of the PC plastic is substantially equal to the dielectric constant of the AES plastic. The rear portion of the transparent member 425 is formed in a shape corresponding to the shape of the front portion of the base member 422. That is, a general portion 426 is formed at the rear of the transparent member 425 and in front of the general portion 423 of the base member 422. The general portion 426 extends to be substantially orthogonal to the front-rear direction. A recess portion 427 is formed at the rear of the transparent member 425 and in front of the protrusion portion 24 of the base member 422. The recess portion 427 is recessed forward from the general portion 426. The transparent member 425 may be formed of polymethyl methacrylate (PMMA) plastic being a plastic material having a small dielectric loss tangent, similar to the PC plastic.

The decorating layer 432 is used for decorating the front portion of the vehicle 410 including the front grille 411. The decorating layer 432 is formed between the base member 422 and the transparent member 425. The decorating layer 432 has millimeter wave transparency. The decorating layer 432 is configured by, for example, a combination of a colored layer of a black color or the like and a metal layer. The colored layer is formed at the general portion 426 of the transparent member 425 by a method such as printing. The metal layer is formed by vapor-depositing a metal material such as indium on the entirety of the rear surface of the recess portion 427 of the transparent member 425 and the rear surface of the colored layer. In the decorating layer 432, in order to suppress corrosion of the metal layer, the metal layer may be covered by a corrosion prevention layer made of an acrylic or urethane plastic material.

Figure 31:
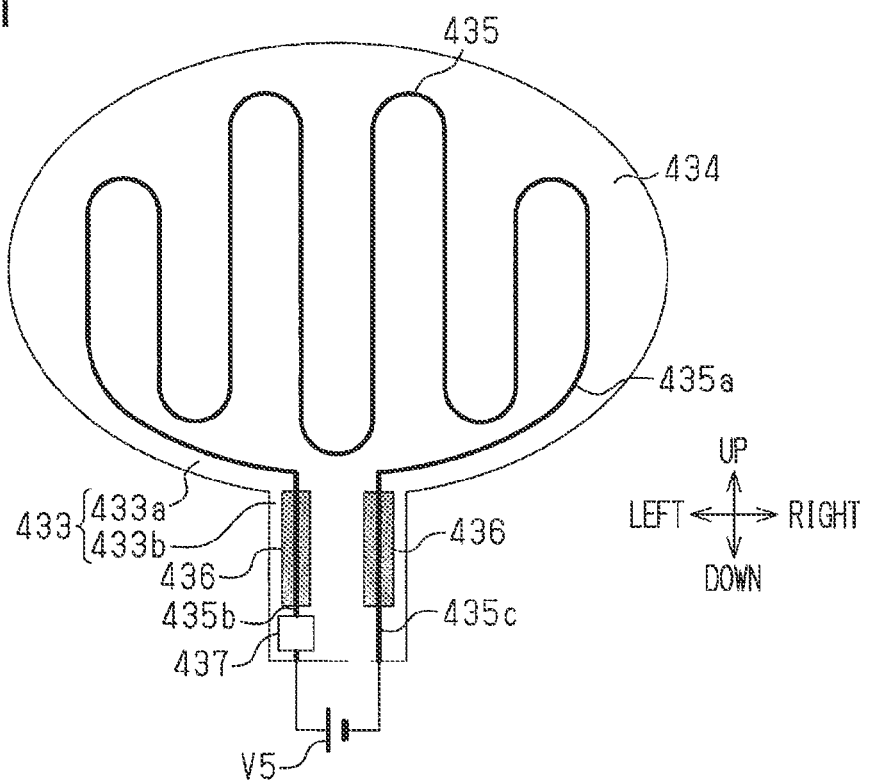
FIG. 31 is a front view illustrating a heating sheet taken out from the emblem according to the fifth embodiment.

The heating sheet 433 is also called a planar heating element, a film heater, or the like. As illustrated in FIGS. 29 to 31, the heating sheet 433 has a main portion 433a and a connection portion 433b.

The main portion 433a of the heating sheet 433 is disposed to overlap the transparent member 425 from the front. The main portion 433a is in close contact with the front surface of the transparent member 425 and is integrated with the transparent member 425. The main portion 433a has an elliptical plate shape as a whole, and is gently bent to swell forward, similar to the above-described decorative main body portion 421.

The connection portion 433b of the heating sheet 433 extends in a band shape from the lower end portion of the main portion 433a to the outside of the decorative main body portion 421. The connection portion 433b has a bent portion 433c at a boundary portion with the main portion 433a. The bent portion 433c is bent backward with respect to the main portion 433a. Thus, the connection portion 433b extends backward from the lower end portion of the main portion 433a. The connection portion 433b is set to have dimensions (for example, the dimension in the front-rear direction size is 30 mm, and the dimension in the left-right direction size is 20 mm) smaller than the dimensions of the main portion 433a. In FIG. 31, the connection portion 433b is exaggerated with respect to the main portion 433a in a state where the connection portion 433b is not bent.

The heating sheet 433 includes a plastic sheet 434 and a linear heater portion 435. The heater portion 435 is formed on the plastic sheet 434. The plastic sheet 434 is formed of PC plastic or polyimide plastic, for example. For example, a nichrome wire, an SUS etching heater, a transparent conductive film, a carbon heating element, a silver paste, or the like is used for the linear heater portion 435.

The heater portion 435 includes a heating element 435a that generates heat by energization. The heating element 435a is formed to be repeatedly bent in a wave shape in almost the entire region of the main portion 433a. This suppresses the occurrence of a situation in which a transparent region Z5 (see FIG. 28) of a millimeter wave in the decorative main body portion 421 is blocked by the heating element 435a, that is, transparent of a millimeter wave is hindered.

The heater portion 435 includes a pair of power supply units 435b and 435c. The pair of power supply units 435b and 435c are connected to the opposite ends of the heating element 435a located at the lower end portion of the main portion 433a. The power supply units 435b and 435c are formed to extend linearly in the front-rear direction at the connection portion 433b. The power supply units 435b and 435c are respectively connected to a positive electrode and a negative electrode of a DC power source (for example, in-vehicle battery) V5 at the end portion which is opposite to the connection to the heating element 435a. Thus, power is supplied to the heating element 435a.

A resistance reduction portion 436 is provided in each of the power supply units 435b and 435c so as to overlap each of the power supply units 435b and 435c. The resistance reduction portion 436 extends in a band shape in an extension direction of the power supply units 435b and 435c. The cross-sectional area of the resistance reduction portion 436 is set to be sufficiently larger than the cross-sectional areas of the power supply units 435b and 435c. The resistance reduction portion 436 is provided to increase the conductive cross-sectional area in the power supply units 435b and 435c and to reduce the electrical resistance. For example, a conductive ink such as a silver paste or a carbon paste, or a copper foil is used for the resistance reduction portion 436.

A thermostat 437 is provided in the power supply unit 435b being one of the power supply unit 435b, 435c. The thermostat 437 maintains an appropriate temperature by controlling a current flowing in the power supply unit 435b in accordance with the temperature of the power supply unit 435b. Examples of the thermostat 437 include a thermistor, a bimetal, and a thermocouple.

As illustrated in FIGS. 29 and 30, a hard coat layer 431 is formed on the front surface of the heating sheet 433. The hard coat layer 431 is formed by applying a known surface treatment agent for the plastic. Examples of the surface treatment agent include an organic hard coat agent of acrylate series, oxetane series, silicone series, an inorganic hard coat agent, and an organic-inorganic hybrid hard coat agent. The hard coat layer 31 formed of such a hard coat agent protects the main portion 433a of the heating sheet 433 from the front. Thus, the main portion 433a has useful effects such as an anti-scratching effect, an anti-smudge effect, effects of improving light resistance and weather resistance by UV cut, and an improvement in water repellency.

The hard coat layer 431 may be colored within a range allowing millimeter waves to pass through, if necessary. A water repellent film formed with an organic coating film, a silicone film, or the like may be formed on the front surface (foremost surface of the emblem 420) of the hard coat layer 431. In this case, the front surface of the hard coat layer 431 repels water and becomes difficult to get wet. This suppresses the formation of a water film on the front surface of the hard coat layer 431 during snow melting.

If the emblem 420 configured as described above is fitted into the window portion 412 of the front grille 411 from the front, the decorating layer 432 formed between the base member 422 and the transparent member 425 exhibits a function of decorating the front portion of the vehicle. In a case where the emblem 420 is viewed from the front, light is reflected by the decorating layer 432 formed in an uneven shape. Therefore, a character having metallic luster can be seen three-dimensionally behind the heating sheet 433 and the transparent member 425 through the heating sheet 433 and the transparent member 425.

In order to measure the inter-vehicle distance and the relative speed between the preceding vehicle and the host vehicle (vehicle 410), a millimeter wave is transmitted forward from the millimeter-wave radar device 415. Then, the millimeter wave passes through the base member 422, the decorating layer 432, the transparent member 425, the heating sheet 433, and the hard coat layer 431 in the emblem 420. In the decorating layer 432, the millimeter wave passes through a gap between the deposited metal particles. The millimeter wave passes through a portion of the main portion 433a of the heating sheet 433, at which the heating element 435a is not provided. Similarly, the millimeter wave reflected by an object such as a vehicle or an obstacle ahead in a transmission direction also passes through the decorative main body portion 421 and the heating sheet 433.

In a case where snow collects on the front surface of the emblem 420, power is supplied from the vehicle (DC power supply V5) to the heating element 435a through the power supply units 435b and 435c located in the connection portion 433b (window portion 412 of the front grille 411). With this supply of the power, the heating element 435a generates heat. Thus, the snow collected on the front surface of the emblem 420 is melted by heat generated by the heating element 435a. In particular, the heating element 435a (main portion 433a) is disposed in the vicinity of the front surface of the emblem 420. Therefore, the snow collected on the front surface is melted by the heat generated by the heating element 435a with high efficiency.

The present embodiment has the following advantages.

In the related art, in a vehicle, in order to measure the distance between vehicles or the distance from an obstacle using a millimeter wave, a millimeter-wave radar device may be installed behind a vehicle decorative component such as a front grille and an emblem. In the related art, if snow collects on the vehicle decorative component, the millimeter-wave radar device temporarily stops measurement. However, with the widespread use of the millimeter-wave radar device, it is desired to perform measurement even during snowfall.

It is considered to add a snow melting function to the vehicle decorative component. For example, the vehicle decorative component disclosed in Japanese Laid-Open Patent Publication No. 2017-215242 includes a heating sheet in which at least a main portion is integrally provided on a decorative main body portion for decorating a vehicle. The heating sheet is configured by forming a linear heater portion on a plastic sheet. Snow collected on the vehicle decorative component is melted by heat generated by the heating sheet (heater portion).

In Japanese Laid-Open Patent Publication No. 2017-215242, the heating sheet includes a connection portion that extends from the main portion to the outside of the decorative main body portion. The connection portion includes a pair of power supply units that form the opposite end portions of the heater portion. Power is supplied to the heater portion by being connected to a DC power source in the power supply unit.

The connection portion has a bent portion that is bent backward with respect to the main portion, at a boundary portion with the main portion. Thus, the connection portion extends backward from the lower end portion of the main portion. Accordingly, in the heater portion, abnormal heat generation may occur by increasing the bending amount of the wiring of the power supply unit in the connection portion.

The vehicle decorative component to solve the above problem includes the decorative main body portion and the heating sheet. The decorative main body portion is attached to the front of the vehicle in the transmission direction of a millimeter wave from the millimeter-wave radar device to decorate the vehicle. The decorative main body portion has millimeter wave transparency. The heating sheet has the main portion and the connection portion. The main portion includes the heating element that generates heat by energization. The connection portion includes the pair of power supply units that supply power to the heating element. The bent portion which is bent with respect to the main portion is formed at a boundary portion with the main portion in the connection portion. The resistance reduction portion for reducing electrical resistance of the power supply unit is provided in the power supply unit.

According to the above configuration, electrical conduction of the power supply unit is accelerated by the resistance reduction portion. Thus, even though the bent portion is formed in the connection portion, it is possible to suppress the occurrence of abnormal heat generation in the power supply unit.

The advantages of the present embodiment will now be described in more detail.

(1) In the present embodiment, the electric conduction of the power supply units 435b and 435c is accelerated by the resistance reduction portion 436. Thus, even though the bent portion 433c is formed in the connection portion 433b of the heating sheet 433, it is possible to suppress the occurrence of abnormal heat generation in the power supply units 435b and 435c.

In particular, wiring tends to relatively concentrate on the connection portion 433b having dimensions smaller than those of the main portion 433a, and heat is likely to be generated. In this point, such countermeasures for suppressing abnormal heat generation are also effective.

(2) In the present embodiment, it is possible to maintain an appropriate temperature in a manner that the current flowing in the power supply unit 435b is controlled in accordance with the temperature of the power supply unit 435b by the thermostat 437 provided in the power supply unit 435b. Therefore, it is possible to further suppress the occurrence of abnormal heat generation in the power supply unit 435b.

Sixth Embodiment

Figure 32:
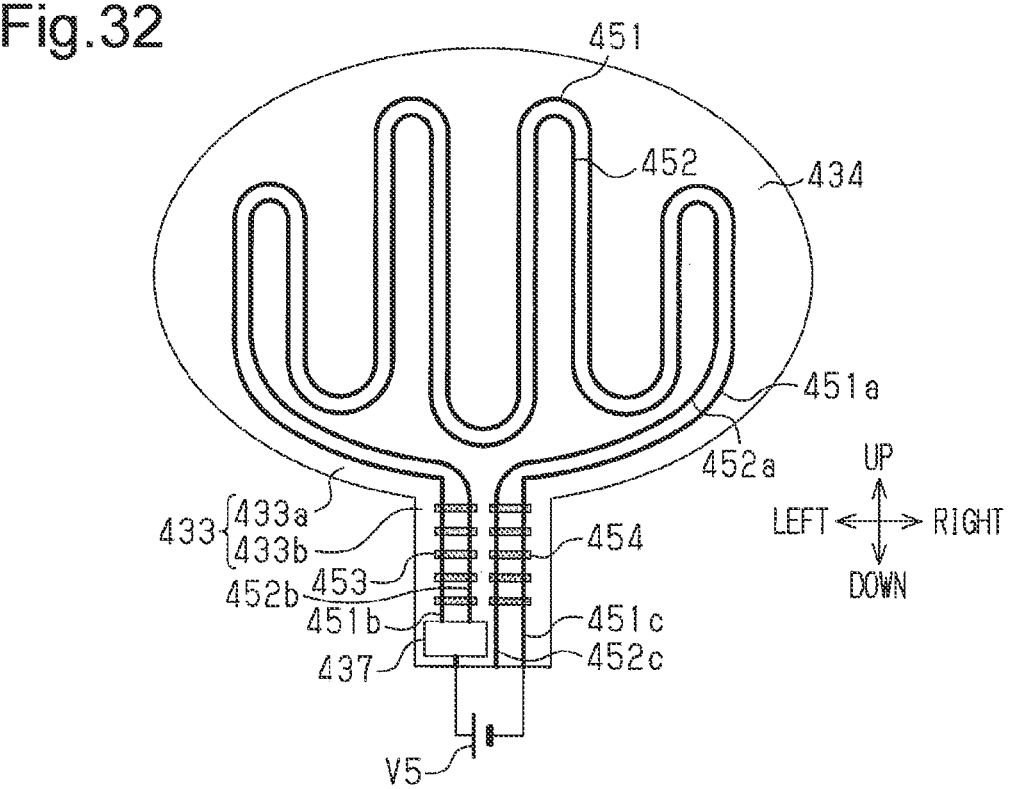
FIG. 32 is a front view illustrating a heating sheet taken out from an emblem in a sixth embodiment.
Figure 33:
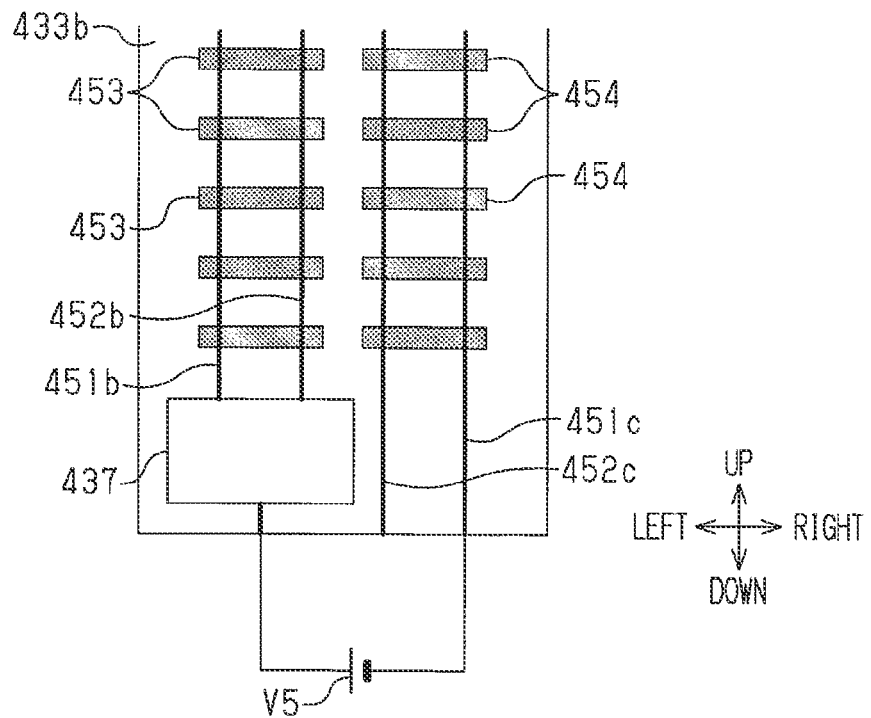
FIG. 33 is an enlarged view illustrating a connection portion of the heating sheet in the sixth embodiment.

Next, a vehicle decorative component according to a sixth embodiment will be described with reference to FIGS. 32 and 33. In the drawings, the connection portion 433b is exaggerated with respect to the main portion 433a in a state where the connection portion 433b is not bent.

The sixth embodiment is similar to the fifth embodiment in that the heating sheet 433 is configured by the main portion 433a and the connection portion 433b. However, the wiring pattern of the heating sheet 433 in the sixth embodiment is different from that in the fifth embodiment.

That is, two linear heater portions 451 and 452 according to the heater portion 435 are provided on the plastic sheet 434 of the heating sheet 433.

Among the heater portions 451 and 452, one heater portion 451 includes a heating element 451a and a pair of power supply units 451b and 451c. The heating element 451a generates heat by energization. The pair of power supply units 451b and 451c are connected to the opposite ends of the heating element 451a, respectively. The heating element 451a is formed to be repeatedly bent in a wave shape in almost the entire region of the main portion 433a. The power supply units 451b and 451c are formed to extend linearly in the front-rear direction at the connection portion 433b. The power supply units 451b and 451c are respectively connected to a positive electrode and a negative electrode of a DC power source V5 at the end portion which is opposite to the connection to the heating element 451a. Thus, power is supplied to the heating element 451a.

Similarly, among the heater portions 451 and 452, the other heater portion 452 includes a heating element 452a and a pair of power supply units 452b and 452c. The heating element 452a generates heat by energization. The pair of power supply units 452b and 452c are connected to the opposite ends of the heating element 452a, respectively. The heating element 452a is formed to be repeatedly bent in a wave shape along the heating element 451a inside the heating element 451a. The power supply units 452b and 452c are formed between the power supply units 451b and 451c to extend linearly in the front-rear direction along the power supply units 451b and 451c. The power supply units 452b and 452c are respectively connected to a positive electrode and a negative electrode of a DC power source V5 at the end portion which is opposite to the connection to the heating element 452a. Thus, power is supplied to the heating element 452a.

That is, the heating sheet 433 includes two sets of heater portions 451 and 452. In the heater portion 451, the heating element 451a and the power supply units 451b and 451c form one set. In the heater portion 452, the heating element 452a and the power supply units 452b and 452c form one set.

A plurality (for example, five) of wiring connection portions 453 as the resistance reduction portion are arranged on the plastic sheet 434 of the heating sheet 433. With the wiring connection portion 453, the power supply units 451b and 452b having the same polarity in the two sets of heater portions 451 and 452 are connected to each other. The wiring connection portion 453 extends in a band shape in a direction substantially orthogonal to the extension direction, so as to cross between the power supply units 451b and 452b. The cross-sectional area of the wiring connection portion 453 is set to be sufficiently larger than the cross-sectional areas of the power supply units 451b and 452b. For example, a conductive ink such as a silver paste or a carbon paste, or a copper foil is used for the wiring connection portion 453. The wiring connection portion 453 forms a grid pattern and partially enlarges the conductive cross-sectional area of the power supply units 451b and 452b. Thus, the electrical resistance of the power supply units 451b and 452b is simultaneously reduced.

Similarly, a plurality (for example, five) of wiring connection portions 454 as the resistance reduction portion are arranged on the plastic sheet 434 of the heating sheet 433. With the wiring connection portion 454, the power supply units 451c and 452c having the same polarity in the two sets of heater portions 451 and 452 are connected to each other. The wiring connection portion 454 extends in a band shape in a direction substantially orthogonal to the extension direction, so as to cross between the power supply units 451c and 452c. The cross-sectional area of the wiring connection portion 454 is set to be sufficiently larger than the cross-sectional areas of the power supply units 451c and 452c. For example, a conductive ink such as a silver paste or a carbon paste, or a copper foil is also used for the wiring connection portion 454. The wiring connection portion 454 forms a grid pattern and partially enlarges the conductive cross-sectional area of the power supply units 451c and 452c. Thus, the electrical resistance of the power supply units 451c and 452c is simultaneously reduced.

The thermostat 437 is provided in the power supply units 451b and 452b in the two sets of heater portions 451 and 452. The thermostat 437 is provided to be shared by the power supply units 451b and 452b.

The configuration other than the above is similar to the fifth embodiment. Thus, the same components as those in the fifth embodiment are given the same reference numerals, and detailed explanations are omitted.

In the vehicle decorative component to solve the above-described problem in the fifth embodiment, preferably, the heating sheet includes a plurality of sets of heater portions, each set including the heating element and the pair of power supply units. The resistance reduction portion is preferably a wiring connection portion at which the power supply units having the same polarity in the plurality of sets of heater portions are connected to each other.

According to the above configuration, it is possible to simultaneously reduce the electrical resistance of the power supply unit in the plurality of sets of heater portions by connecting the power supply units having the same polarity in the plurality of sets of heater portions, to each other by the wiring connection portion.

The advantages of the present embodiment will now be described in more detail. The present invention has the following advantages in addition to the advantages of the fifth embodiment.

(1) In the present embodiment, the power supply units 451b and 452b having the same polarity in the plurality of sets of heater portions 451 and 452 are connected to each other by the wiring connection portion 453, and 451c and 452c having the same polarity are connected to each other by the wiring connection portion 454. Thus, it is possible to simultaneously reduce the electrical resistance of the power supply units 451b and 452b in the plurality of sets of heater portions 451 and 452 and to simultaneously reduce the electrical resistance of the power supply units 451c and 452c.

Seventh Embodiment

Figure 34:
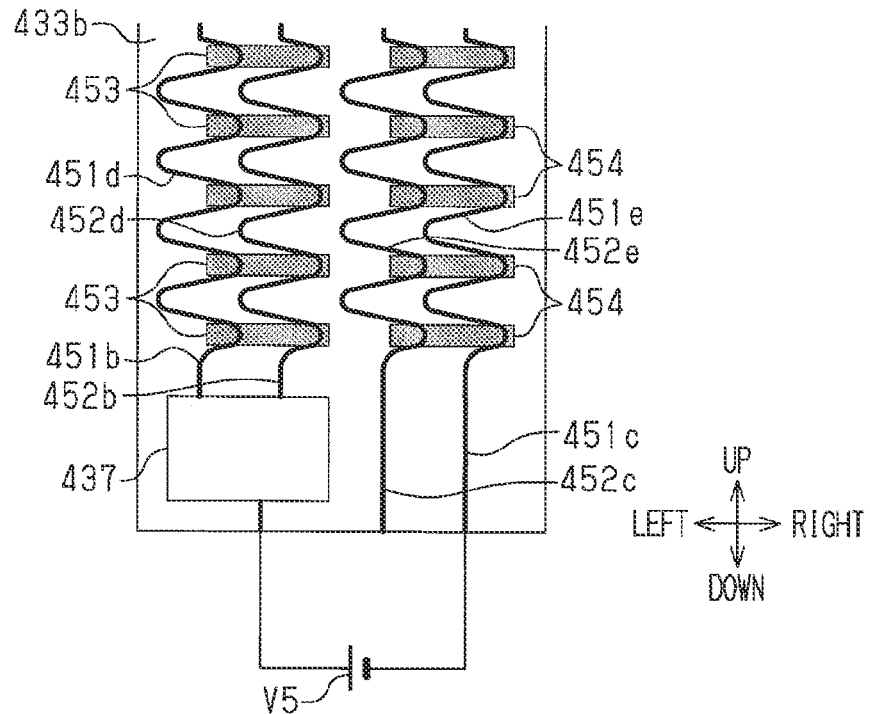
FIG. 34 is an enlarged view illustrating a connection portion of a heating sheet in a seventh embodiment.

Next, a vehicle decorative component according to a seventh embodiment will be described with reference to FIG. 34. In FIG. 34, the connection portion 433b is exaggerated in a state where the connection portion 433b is not bent.

The seventh embodiment is similar to the sixth embodiment in that the heating sheet 433 is configured by the main portion 433a and the connection portion 433b, and two sets of heater portions 451 and 452 are provided on the plastic sheet 434 of the heating sheet 433. However, the wiring pattern in the connection portion 433b in the seventh embodiment is different from that in the sixth embodiment.

That is, curved portions 451d and 451e are formed in the power supply units 451b and 451c of the heater portion 451, respectively. The curved portions 451d and 451e are formed to be repeatedly bent in a wave shape in almost the entire length. The curved portions 451d and 451e are formed in a range including the bent portion 433c.

Similarly, curved portions 452d and 452e are formed in the power supply units 452b and 452c of the heater portion 452, respectively. The curved portions 452d and 452e are formed to be repeatedly bent in a wave shape in almost the entire length. The curved portions 452d and 452e are formed in a range including the bent portion 433c.

The configuration other than the above is similar to the sixth embodiment. Thus, the same components as those in the sixth embodiment are given the same reference numerals, and detailed explanations are omitted.

In the vehicle decorative component to solve the above-described problem in the fifth embodiment, preferably, the curved portion is formed at at least the bent portion in the power supply unit.

According to the above configuration, bendability of the power supply unit is improved by the curved portion. Thus, it is possible to suppress disconnection of the power supply unit at the bent portion.

The advantages of the present embodiment will now be described in more detail. The present invention has the following advantages in addition to the advantages of the sixth embodiment.

(1) In the present embodiment, the bendability of the power supply units 451b, 451c, 452b, and 452c is improved by the curved portions 451d, 451e, 452d, and 452e, respectively. Thus, it is possible to suppress disconnection of the power supply units 451b, 451c, 452b, 452c at the bent portion 433c. In addition, it is possible to suppress the occurrence of abnormal heat generation of the power supply units 451b, 451c, 452b, 452c at the bent portion 433c.

Eighth Embodiment

Figure 35:
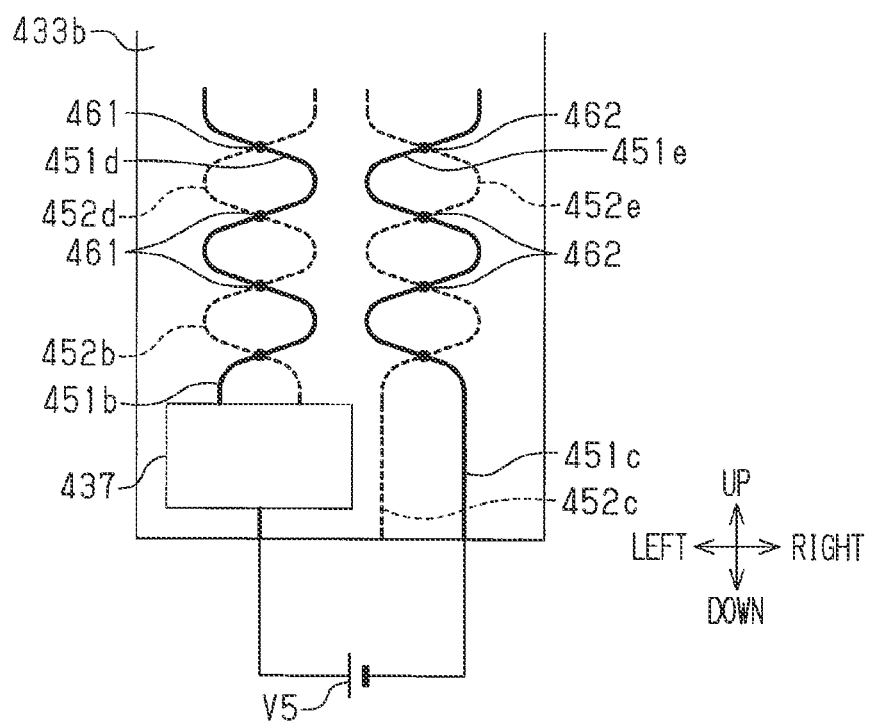
FIG. 35 is an enlarged view illustrating a connection portion of a heating sheet in an eighth embodiment.

Next, a vehicle decorative component according to an eighth embodiment will be described with reference to FIG. 35. In FIG. 35, the connection portion 433b is exaggerated in a state where the connection portion 433b is not bent. The power supply units 452b and 452c of the heater portion 452 are illustrated by broken lines for convenience.

The eighth embodiment is similar to the seventh embodiment in that the heating sheet 433 is configured by the main portion 433a and the connection portion 433b, and two sets of heater portions 451 and 452 are provided on the plastic sheet 434 of the heating sheet 433. However, the wiring pattern in the connection portion 433b in the eighth embodiment is different from that in the seventh embodiment.

That is, the power supply units 451b and 452b having the same polarity in the two sets of heater portions 451 and 452 have curved portions 451d and 452d having different curvatures, such that the power supply units 451b and 452b intersect with each other. The power supply units 451b and 452b are connected to each other at a cross connection portion 461 as the resistance reduction portion, instead of the wiring connection portion 453. The cross connection portion 461 is located at an intersection at which the power supply units 451b and 452b intersect with each other.

Similarly, the power supply units 451c and 452c having the same polarity in the two sets of heater portions 451 and 452 have curved portions 451e and 452e having different curvatures, such that the power supply units 451c and 452c intersect with each other. The power supply units 451c and 452c are connected to each other at a cross connection portion 462 as the resistance reduction portion, instead of the wiring connection portion 454. The cross connection portion 462 is located at an intersection at which the power supply units 451c and 452c intersect with each other.

The configuration other than the above is similar to the seventh embodiment. Thus, the same components as those in the seventh embodiment are given the same reference numerals, and detailed explanations are omitted.

In the vehicle decorative component to solve the above-described problem in the fifth embodiment, preferably, the heating sheet includes a plurality of sets of heater portions, each set including the heating element and the pair of power supply units. The resistance reduction portion is preferably a cross connection portion at which the power supply units having the same polarity in the plurality of sets of heater portions are connected to each other at the intersection at which the power supply units intersect with each other.

According to the above configuration, the intersection is formed by crossing the power supply units having the same polarity in the plurality of sets of heater portions to each other. In the intersection, the cross connection portion at which the power supply units are connected to each other is formed. Thus, it is possible to simultaneously reduce the electrical resistance of the power supply units in the plurality of sets of heater portions.

The advantages of the present embodiment will now be described in more detail. The present invention has the following advantages in addition to the advantages of the fifth embodiment and the advantage (1) of the seventh embodiment.

(1) In the present embodiment, the intersection is formed by crossing the power supply units 451b and 452b having the same polarity and crossing the power supply units 451c and 452*c* having the same polarity in the plurality of sets of heater portions 451 and 452. In the intersection, the cross connection portion 461 at which the power supply units 451*b* and 452*b* are connected to each other and the cross connection portion 462 at which the power supply units 451*c* and 452*c* are connected to each other are formed. Thus, it is possible to simultaneously reduce the electrical resistance of the power supply units 451*b* and 452*b* in the two sets of heater portions 451 and 452 and to simultaneously reduce the electrical resistance of the power supply units 451*c* and 452*c*.

The present embodiment may be modified as follows. The present embodiment and the following modifications can be combined as long as the combined modifications remain technically consistent with each other.

In the fifth embodiment, the curved portion may be formed in the power supply units 435*b* and 435*c* at at least the bent portion 433*c*.

In the sixth embodiment and the seventh embodiment, the number of wiring connection portions 453 and 454 may be changed to any value. For example, the number of wiring connection portions 453 and 454 may be one.

In the sixth embodiment and the seventh embodiment, instead of the wiring connection portions 453 and 454, a resistance reduction portion extending in a band shape in the extension direction of the power supply units 451*b*, 451*c*, 452*b*, and 452*c* may be employed. That is, in the plurality of sets of heater portions 451 and 452, the power supply units 451*b* and 452*b* having the same polarity do not necessarily need to be connected to each other, and the power supply units 451*c* and 452*c* having the same polarity do not necessarily need to be connected to each other.

In the seventh embodiment and the eighth embodiment, the curved portions 451*d*, 451*e*, 452*d*, and 452*e* are formed in the power supply units 451*b*, 451*c*, 452*b*, and 452*c* over the substantially entire length, respectively. On the other hand, as long as at least the range of the bent portion 433*c* is included, the curved portions 451*d*, 451*e*, 452*d*, and 452*e* may be formed only in some of the power supply units 451*b*, 451*c*, 452*b*, and 452*c*. In this case, the bending amount of the power supply units 451*b*, 451*c*, 452*b*, and 452*c* is more preferably larger than the extension amount of the connection portion 433*b* when the connection portion 433*b* is bent, in order to suppress disconnection thereof. Specifically, the power supply units 451*b*, 451*c*, 452*b*, and 452*c* are more preferably curved by 30% or more of a straight line in order to suppress disconnection thereof.

In the seventh embodiment and the eighth embodiment, the curved portions 451*d*, 451*e*, 452*d*, and 452*e*, which are repeatedly bent in a wave shape, are formed in the power supply units 451*b*, 451*c*, 452*b*, and 452*c*, respectively. On the other hand, for example, the curved portions 451*d*, 451*e*, 452*d*, and 452*e* that are repeatedly bent in a rectangular shape or a saw blade shape may be formed in the power supply units 451*b*, 451*c*, 452*b*, and 452*c*, respectively.

In the seventh embodiment and the eighth embodiment, the number of times of bending of the curved portions 451*d*, 451*e*, 452*d*, and 452*e* may be changed to any value. For example, the bending of the curved portions 451*d*, 451*e*, 452*d*, and 452*e* may be repeated once.

In the sixth to eighth embodiments, the heating sheet may include three or more sets of heater portions, each set including the heating element and the pair of power supply units. In such a case, the power supply units having the same polarity in three or more sets of heater portions may be connected to each other at the wiring connection portion or the cross connection portion.

In the eighth embodiment, the number of the cross connection portions 461 and 462 may be changed to any value. For example, the number of the cross connection portions 461 and 462 may be one.

In the above embodiments, the wiring pattern in the heating elements 435*a*, 451*a*, and 452*a* may be appropriately changed. For example, the wiring pattern in the heating elements 435*a*, 451*a*, and 452*a* may be elliptical along the outer circumference of the plastic sheet 434 (emblem 420). Alternatively, the wiring pattern in the heating elements 435*a*, 451*a*, 452*a* may be, for example, a straight line extending in the left-right direction or the up-down direction.

In the above embodiments, the heating sheet 433 in which the linear heater portions 435, 451, and 452 made of a transparent conductive film are formed on the transparent plastic sheet 434 may be used. The transparent conductive film is formed, for example, by performing sputtering, vapor-deposition, or the like of indium tin oxide (ITO). In this case, the heater portions 435, 451, and 452 are difficult to see, and thus the appearance of the emblem 420 is improved.

In the above embodiments, the heating sheet 433 may be further bent within a range of the connection portion 433*b* (other than the boundary portion with the main portion 433*a*). For example, the connection portion 433*b* may be bent upward at the intermediate portion and extend upward from the intermediate portion.

In the above embodiments, the wiring pattern (heater portions 435, 451, 452, and the like) on the plastic sheet 434 may be further covered with a plastic material from the front.

In the above embodiments, at least the main portion 433*a* of the heating sheet 433 may be disposed between the decorating layer 432 and the transparent member 425 so as to overlap the decorating layer 432 and the transparent member 425.

In the above embodiments, the transparent member 425 may be divided into a front transparent member forming the front portion and a rear transparent member forming the rear portion. In this case, the main portion 433*a* of the heating sheet 433 may be disposed between the front transparent member and the rear transparent member so as to overlap the front transparent member and the rear transparent member.

In the above embodiments, a heat transfer suppression layer may be formed between the decorating layer 432 and the base member 422. The heat transfer suppression layer is made of a material (for example ultraviolet (UV) curable coating material) having a higher deflection temperature (heat deformation temperature) than that of the base member 422. In this case, transfer of the heat generated in the heater portions 435, 451, and 452 to the base member 422 is suppressed by the heat transfer suppression layer. This suppresses deformation of the base member 422 by heat from the heater portions 435, 451, and 452.

In the above embodiments, the decorative main body portion 421 may be formed in a plate shape different from an ellipse.

In the above embodiments, the emblem 420 may be attached to the vehicle body instead of the front grille 411.

The vehicle decorative component is attached to the front in the transmission direction of a millimeter wave from the millimeter-wave radar device 415 in the vehicle 410, and decorates the vehicle 410. The vehicle decorative component may be applied to a vehicle decorative component different from the emblem 420 so long as the vehicle decorative component has millimeter wave transparency.

A technical idea that can be obtained from the above embodiments and the modifications will be described.

In the above vehicle decorative component, a thermostat is provided in the power supply unit.

According to the above configuration, it is possible to maintain an appropriate temperature in a manner that the current flowing in the power supply unit is controlled in accordance with the temperature of the power supply unit by the thermostat provided in the power supply unit. It is possible to further suppress the occurrence of abnormal heat generation in the power supply unit.

The invention claimed is:

1. A vehicle decorative component comprising:
a heating element configured by stacking first and second sheet materials and interposing a heater wire that generates heat by energization between the first and second sheet materials;
a base member including a laying surface for the heating element on a front surface forming a design surface; and
a power source portion forming a power supply path for the heating element, wherein
the heating element includes
a main body portion fixed to the laying surface, and
an extending portion that includes a power source connection portion for connecting the heater wire to the power source portion and extends to a back surface of the base member,
the main body portion is fixed to the laying surface by fixing the second sheet material to the base member, and
the heater wire is exposed in the power source connection portion without stacking the second sheet material on the first sheet material.

2. The vehicle decorative component according to claim 1, wherein the second sheet material is an adhesive sheet having an adhesive force to the base member.

3. The vehicle decorative component according to claim 1, wherein a hole portion that extends through the first sheet material to expose the heater wire is provided in the power source connection portion.

4. The vehicle decorative component according to claim 1, wherein the first and second sheet materials are transparent sheets.

* * * * *